US012205207B2

(12) United States Patent
Smetanin et al.

(10) Patent No.: US 12,205,207 B2
(45) Date of Patent: Jan. 21, 2025

(54) AUTOMATIC IMAGE GENERATION IN AN INTERACTION SYSTEM

(71) Applicant: Snap Inc., Santa Monica, CA (US)

(72) Inventors: Sergey Smetanin, London (GB); Arnab Ghosh, Oxford (GB); Pavel Savchenkov, London (GB); Jian Ren, Marina Del Ray, CA (US); Sergey Tulyakov, Marina del Rey, CA (US); Ivan Babanin, London (GB); Timur Zakirov, London (GB); Roman Golobokov, London (GB); Aleksandr Zakharov, Dubai (AE); Dor Ayalon, Glasgow (GB); Nikita Demidov, London (GB); Vladimir Gordienko, London (GB); Daniel Moreno, Los Angeles, CA (US); Nikita Belosludtcev, London (GB); Sofya Savinova, Lehi, UT (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/176,971

(22) Filed: Mar. 1, 2023

(65) Prior Publication Data
US 2024/0296606 A1 Sep. 5, 2024

(51) Int. Cl.
*G06F 3/0482* (2013.01)
*G06T 11/60* (2006.01)

(52) U.S. Cl.
CPC ............ *G06T 11/60* (2013.01); *G06F 3/0482* (2013.01); *G06T 2200/24* (2013.01)

(58) Field of Classification Search
CPC ................................................. G06F 3/048–05
See application file for complete search history.

(56) References Cited

U.S. PATENT DOCUMENTS

| 7,214,065 | B2 | 5/2007 | Fitzsimmons, Jr. |
| 8,867,849 | B1 * | 10/2014 | Kirkham ................. G06F 18/24 |
| | | | 382/305 |

(Continued)

FOREIGN PATENT DOCUMENTS

| CN | 115391588 A | 11/2022 |
| EP | 3698258 A1 | 8/2020 |

OTHER PUBLICATIONS midjourney.co.in, "Midjourney Banned Words: Understanding the AI image Generator's Restrictions", posted on Feb. 24, 2023, available at <<https://midjourney.co.in/midjourney-banned-words-understanding-the-ai-image-generators-restrictions/>>, 9 pages (Year: 2023).*

(Continued)

*Primary Examiner* — Daniel Rodriguez
(74) *Attorney, Agent, or Firm* — Schwegman Lundberg & Woessner, P.A.

(57) ABSTRACT

Examples disclosed herein describe techniques related to automated image generation in an interaction system. An image generation request is received from a first user device associated with a first user of an interaction system. The image generation request comprises a text prompt. Responsive to receiving the image generation request, an image is automatically generated by an automated text-to-image generator, based on the text prompt. The image is caused to be presented on the first user device. An indication of user input to select the image is received from the user device. Responsive to receiving the indication of the user input to select the image, the image is associated with the first user within the interaction system, and a second user of the interaction system is enabled to be presented with the image.

20 Claims, 19 Drawing Sheets

(56) References Cited

U.S. PATENT DOCUMENTS

| | | | |
|---|---|---|---|
| 10,496,924 | B1 | 12/2019 | Highnam et al. |
| 11,445,148 | B1* | 9/2022 | Øhrn ................... G06V 10/772 |
| 11,809,688 | B1* | 11/2023 | Parasnis .............. G06F 3/04845 |
| 11,947,893 | B1* | 4/2024 | Seth ....................... G06F 3/0481 |
| 2014/0051402 | A1* | 2/2014 | Qureshi ................... H04L 51/52 |
| | | | 455/413 |
| 2014/0344712 | A1* | 11/2014 | Okazawa ................ G06F 3/048 |
| | | | 715/752 |
| 2016/0188153 | A1* | 6/2016 | Lerner .................... H04L 51/52 |
| | | | 709/206 |
| 2020/0267182 | A1 | 8/2020 | Highnam et al. |
| 2021/0042796 | A1 | 2/2021 | Khoury et al. |
| 2021/0209184 | A1* | 7/2021 | Huang .............. G06F 18/24133 |
| 2021/0352460 | A1 | 11/2021 | Rohde et al. |
| 2022/0036153 | A1 | 2/2022 | O'Malia et al. |
| 2022/0101578 | A1 | 3/2022 | Bedi et al. |
| 2022/0114698 | A1 | 4/2022 | Liu |
| 2023/0025835 | A1 | 1/2023 | Moriya et al. |
| 2023/0054174 | A1 | 2/2023 | Peled et al. |
| 2023/0177878 | A1 | 6/2023 | Sekar et al. |
| 2023/0215441 | A1 | 7/2023 | Wu |
| 2023/0222703 | A1* | 7/2023 | Baheti ..................... G06F 40/30 |
| | | | 382/181 |
| 2023/0230198 | A1 | 7/2023 | Zhang et al. |
| 2023/0260164 | A1 | 8/2023 | Yuan et al. |
| 2023/0262102 | A1* | 8/2023 | Das ........................ H04N 7/147 |
| | | | 715/753 |
| 2023/0281789 | A1 | 9/2023 | Sudarsky et al. |
| 2023/0298224 | A1 | 9/2023 | Aggarwal et al. |
| 2023/0342284 | A1 | 10/2023 | Easton et al. |
| 2024/0135610 | A1* | 4/2024 | Kolkin ..................... G06T 11/60 |
| 2024/0161258 | A1 | 5/2024 | Maschmeyer et al. |
| 2024/0169622 | A1* | 5/2024 | Xie .......................... G06T 11/00 |
| 2024/0193821 | A1* | 6/2024 | Denison .................. G06F 40/40 |
| 2024/0362830 | A1 | 10/2024 | Zhang et al. |

OTHER PUBLICATIONS

Emoji World, "AI Prompt Art Maker Generator", available Dec. 6, 2022, available at <<https://apps.apple.com/us/app/ai-prompt-art-maker-generator/id6444807049>>, 5 pages (Year: 2022).*

Praneeth Palli, "Want to Change Wallpaper for a Specific Chat on WhatsApp? Follow These Steps", published May 17, 2022, available at <<https://in.mashable.com/tech/31833/want-to-change-wallpaper-for-a-specific-chat-on-whatsapp-follow-these-steps>>, 6 pages (Year: 2022).*

Li, Junnan, "BLIP: Bootstrapping Language-Image Pre-training for Unified Vision-Language Understanding and Generation", arXiv: 2201.12086v2 [cs.CV], (Feb. 15, 2022), 12 pgs.

Schuhmann, Christoph, "CLIP+MLP Aesthetic Score Predictor", [Online] Retrieved from the Internet: URL: https:github.com christophschuhmann improved-aesthetic-predictor, (Jun. 30, 2022), 2 pgs.

Vincent, James, "TikTok Now Offers a Very Basic Text-to-Image AI Generator Directly in the App", The Verge, (Aug. 15, 2022), 4 pgs.

"U.S. Appl. No. 18/116,003, Non Final Office Action mailed Sep. 26, 2023", 26 pgs.

"U.S. Appl. No. 18/116,003, Response filed Dec. 18, 2023 to Non Final Office Action mailed Sep. 26, 2023", 11 pgs.

U.S. Appl. No. 18/115,997, filed Mar. 1, 2023, Aspect Ration Conversion for Automated Image Generation.

U.S. Appl. No. 18/116,003, filed Mar. 1, 2023, Prompt Modification for Automated Image Generation.

U.S. Appl. No. 18/176,843, filed Mar. 1, 2023, Automatic Image Quality Evaluation.

"U.S. Appl. No. 18/116,003, Final Office Action mailed Mar. 20, 2024", 27 pgs.

"U.S. Appl. No. 18/116,003, Response filed May 15, 24 to Final Office Action mailed Mar. 20, 2024", 9 pgs.

"International Application Serial No. PCT US2024 017140, International Search Report mailed May 28, 2024", 4 pgs.

"International Application Serial No. PCT US2024 017140, Written Opinion mailed May 28, 2024", 5 pgs.

"International Application Serial No. PCT US2024 016539, International Search Report mailed May 31, 2024", 3 pgs.

"International Application Serial No. PCT US2024 016539, Written Opinion mailed May 31, 2024", 5 pgs.

Oppenlaender, Jonas, "A taxonomy of prompt modifiers for text-to-image generation", arXiv preprint arXiv:2204.13988v2., (Jul. 31, 2022), 18 pgs.

Shuyang, Gu, "Giqa: Generated Image Quality Assessment", ARXIV. ORG, Cornell University Library, 201 Olin Library Cornell University Ithaca, NY 14853, (Mar. 19, 2020), 26 pgs.

Tan, M Dinh, "TISE: Bag of Metrics for Text-to-Image Synthesis Evaluation", ARXIV.ORG, Cornell University Library, 201 Olin Library Cornell University Ithaca, NY 14853, (Jul. 19, 2022), 34 pgs.

Yaru, Hao, "Optimizing Prompts for Text-to-Image Generation", ARXIV.ORG, Cornell University Library, 201 Olin Library Cornell University Ithaca, NY 14853, (Dec. 19, 2022), 16 pgs.

Yu, Wenxin, "Blind Image Quality Assessment for a Single Image From Text to Image Synthesis", IEEE Access IEEE USA vol. 9, (Jul. 1, 2021), 12 pgs.

"U.S. Appl. No. 18/116,003, Notice of Allowability mailed Jun. 20, 2024", 2 pgs.

"U.S. Appl. No. 18/116,003, Notice of Allowance mailed Jun. 7, 2024", 7 pgs.

"U.S. Appl. No. 18/116,003, Notice of Allowance mailed Jul. 26, 2024", 7 pgs.

"International Application Serial No. PCT/US2024/016223, International Search Report mailed Jun. 18, 2024", 4 pgs.

"International Application Serial No. PCT/US2024/016223, Written Opinion mailed jun. 18, 2024", 7 pgs.

"International Application Serial No. PCT/US2024/017545, International Search Report mailed Jun. 7, 2024", 3 pgs.

"International Application Serial No. PCT/US2024/017545, Written Opinion mailed Jun. 7, 2024", 7 pgs.

Chen, Shoufa, et al., "DiffusionDet: Diffusion Model for Object Detection", ARXIV.ORG, Cornell University Library, 201, Olin Library Cornell University Ithaca, NY 1485, (Nov. 17, 2022), 16 pgs.

Cheng, Jiaxin, et al., "LayoutDiffuse: Adapting Foundational Diffusion Models for Layout-to-Image Generation", ARXIV.ORG, Cornell University Library, 201 Olin Library Cornell University Ithaca, NY 14853, (Feb. 16, 2023), 15 pgs.

Li, Yuheng, et al., "GLIGEN: Open-Set Grounded Text-to-Image Generation", ARXIV.ORG, Cornell University Library, 201, Olin Library Cornell University Ithaca, NY, 14853, (Jan. 17, 2023), 21 pgs.

"U.S. Appl. No. 18/116,003, Corrected Notice of Allowability mailed Nov. 6, 2024", 2 pgs.

"U.S. Appl. No. 18/176,843, Non Final Office Action mailed Nov. 8, 2024", 16 pgs.

* cited by examiner

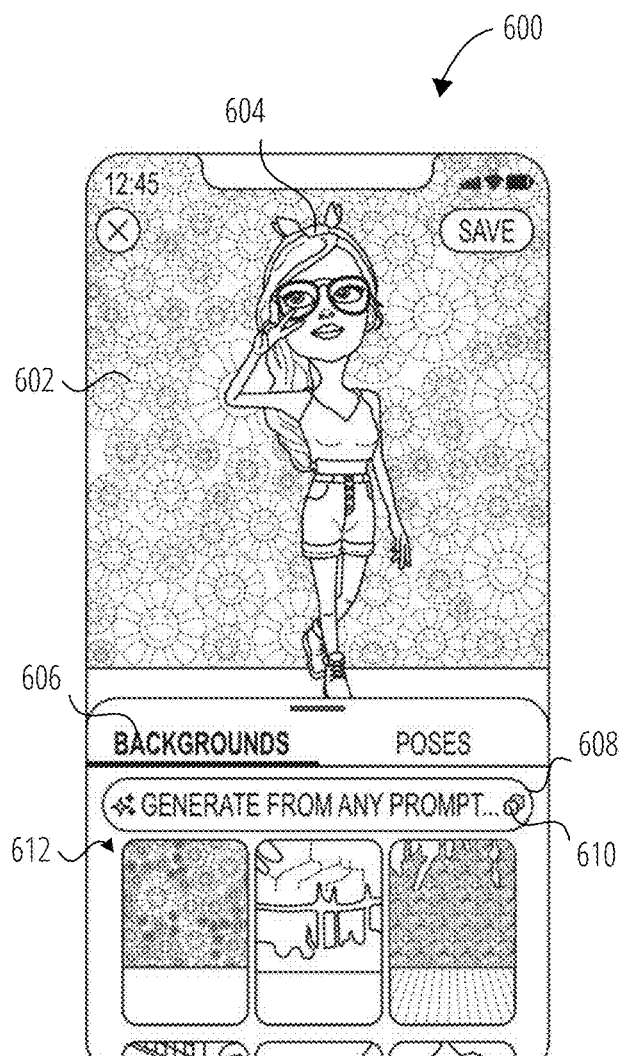 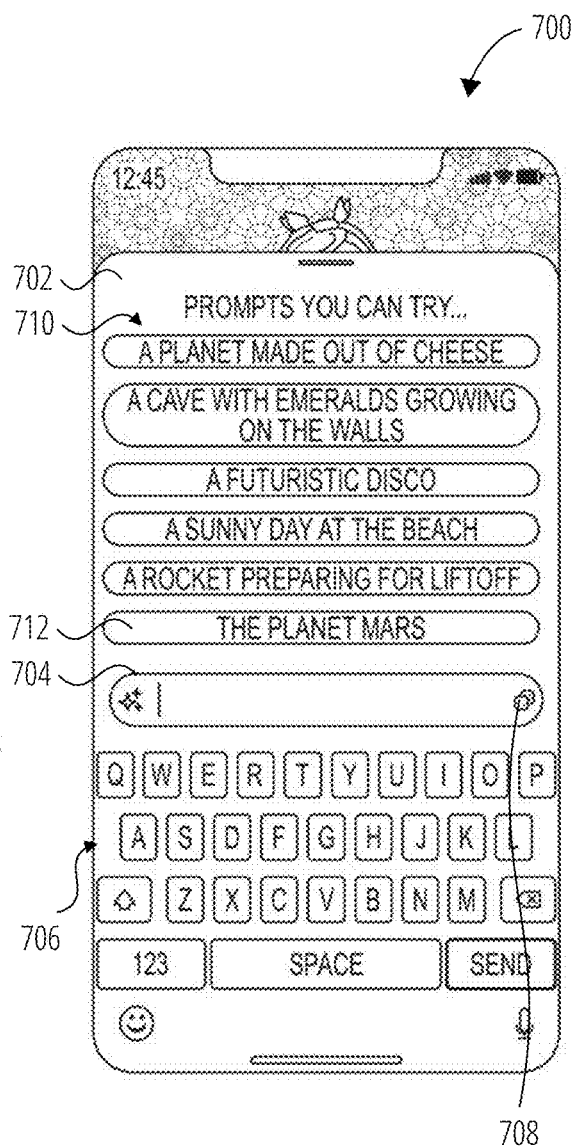
FIG. 6  FIG. 7

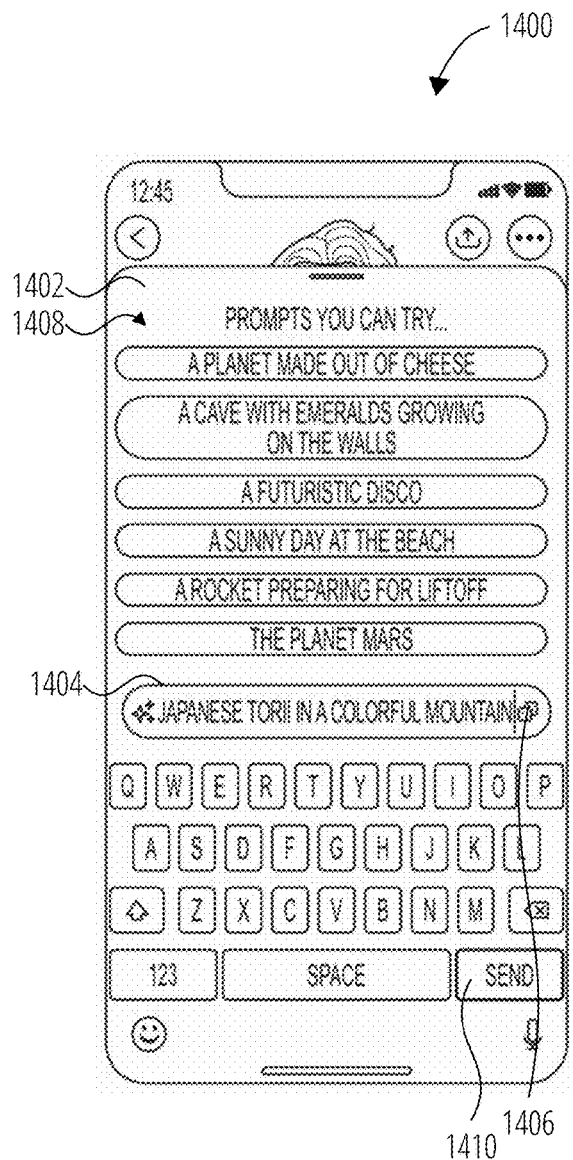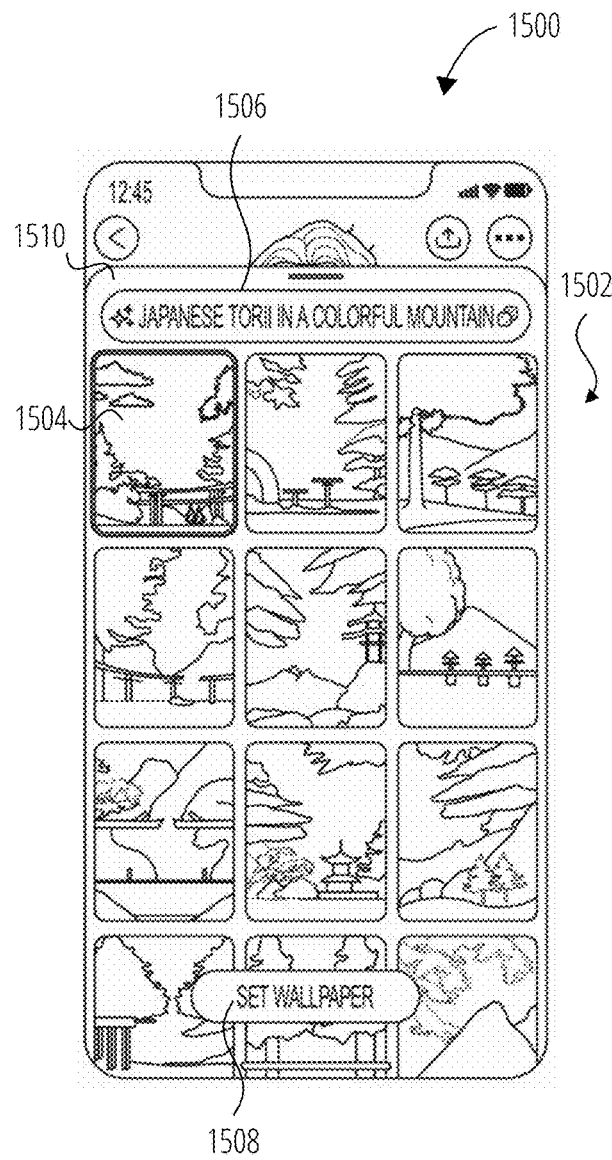
FIG. 14
FIG. 15

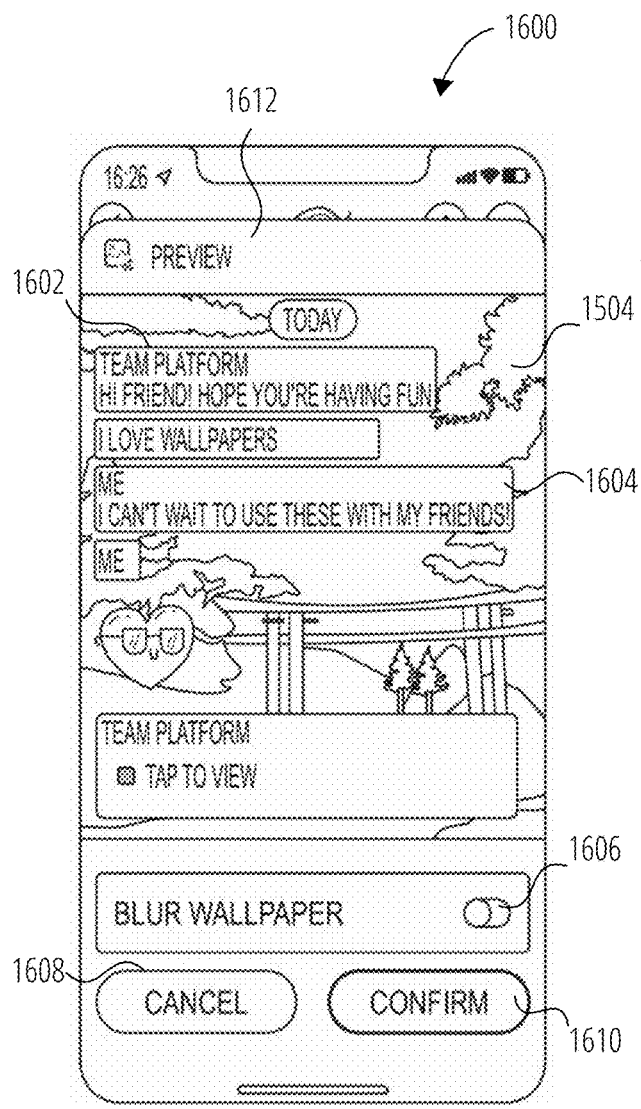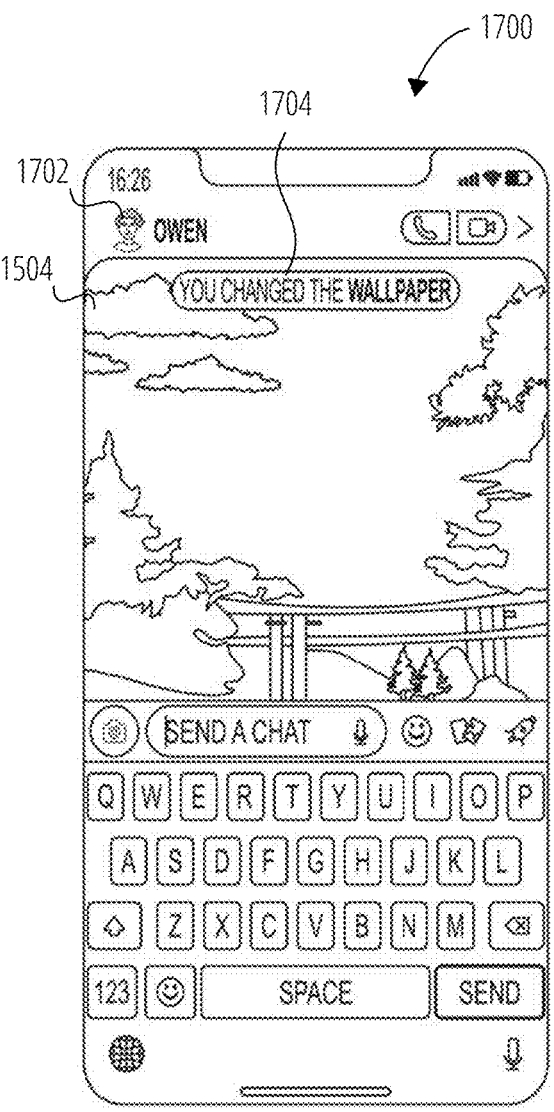
FIG. 16  FIG. 17

AUTOMATIC IMAGE GENERATION IN AN INTERACTION SYSTEM

TECHNICAL FIELD

Subject matter disclosed herein relates to techniques for automated image generation, and to the use of automatically generated images in an interaction system.

BACKGROUND

The field of automated image generation, including artificial intelligence (AI) driven image generation, continues to grow. Machine learning models known as text-to-image models can be trained to analyze natural language descriptions (referred to herein as "text prompts" or simply "prompts") and automatically generate corresponding visual outputs. This process can be referred to as automatic, text-guided image generation.

Automated image generators utilizing such technology, e.g., generators built on diffusion models or Generative Adversarial Networks (GANs), may be able to generate high-fidelity images in response to a user's prompts.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which:

FIG. 6 is a user interface diagram illustrating a profile images interface, according to some examples.

FIG. 7 is a user interface diagram illustrating a prompt selection interface, according to some examples.

FIG. 14 is a user interface diagram illustrating a prompt selection interface, according to some examples.

FIG. 15 is a user interface diagram illustrating an image selection interface, according to some examples.

FIG. 16 is a user interface diagram illustrating a wallpaper preview interface, according to some examples.

FIG. 17 is a user interface diagram illustrating an interaction interface, according to some examples.

DETAILED DESCRIPTION

Examples of the present disclosure allow for automatic image generation in an interaction system. Users are enabled to have unique images generated for them using an automatic image generation feature that is provided via a user-friendly interface. Automatically generated, text-guided images can be linked to users' profiles in the interaction system to provide enhanced functionality and allow users to express themselves in unique and/or creative ways.

Obtaining and using an image in an interaction system, such as a messaging, content sharing, or social media platform, may involve a number of manual steps or selections, particularly in cases where such an image is obtained from an external source. It may be desirable to reduce or automate these steps or selections, at least to some extent. One example technical problem of reducing or automating the above steps or selections may be addressed by automatically generating and applying such an image in one or more interfaces or content items provided by an interaction application of the interaction system (e.g., as a background image, as an image linked to a user profile, or as a content augmentation).

Another example technical problem of enhancing the level of flexibility and customization associated with image generation and selection within an interaction application, including through the use of automated image generation, may be addressed by example systems and methods in the present disclosure.

Networked Computing Environment

Figure 1:
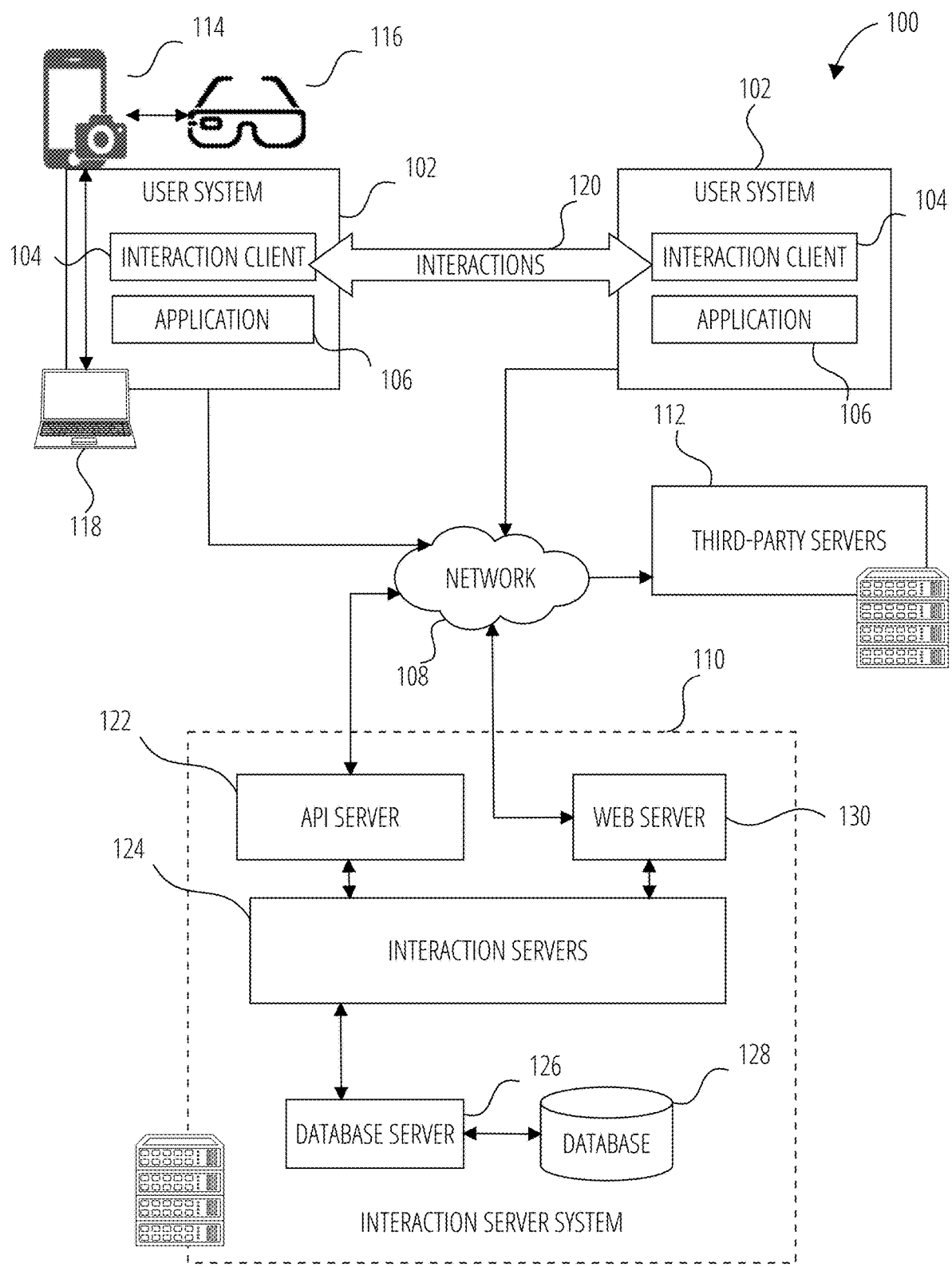
FIG. 1 is a diagrammatic representation of a networked environment in which the present disclosure may be deployed, according to some examples.

FIG. 1 is a block diagram showing an example interaction system 100 for facilitating interactions (e.g., exchanging text messages, conducting text audio and video calls, or playing games) over a network. The interaction system 100 includes multiple user systems 102, each of which hosts multiple applications, including an interaction client 104 (as an example of an interaction application) and other applications 106. Each interaction client 104 is communicatively coupled, via one or more communication networks including a network 108 (e.g., the Internet), to other instances of the interaction client 104 (e.g., hosted on respective other user systems 102), an interaction server system 110 and third-party servers 112). An interaction client 104 can also communicate with locally hosted applications 106 using Applications Program Interfaces (APIs).

Each user system 102 may include multiple user devices, such as a mobile device 114, head-wearable apparatus 116, and a computer client device 118 that are communicatively connected to exchange data and messages.

An interaction client 104 interacts with other interaction clients 104 and with the interaction server system 110 via the network 108. The data exchanged between the interaction clients 104 (e.g., interactions 120) and between the interaction clients 104 and the interaction server system 110 includes functions (e.g., commands to invoke functions) and payload data (e.g., text, audio, video, or other multimedia data).

The interaction server system 110 provides server-side functionality via the network 108 to the interaction clients 104. While certain functions of the interaction system 100 are described herein as being performed by either an interaction client 104 or by the interaction server system 110, the location of certain functionality either within the interaction client 104 or the interaction server system 110 may be a design choice. For example, it may be technically preferable to initially deploy particular technology and functionality within the interaction server system 110 but to later migrate this technology and functionality to the interaction client 104 where a user system 102 has sufficient processing capacity.

The interaction server system 110 supports various services and operations that are provided to the interaction clients 104. Such operations include transmitting data to, receiving data from, and processing data generated by the interaction clients 104. This data may include message content, image content, prompts, client device information, geolocation information, media augmentation and overlays, message content persistence conditions, social network information, and live event information. Data exchanges within the interaction system 100 are invoked and controlled through functions available via user interfaces (UIs) of the interaction clients 104.

Turning now specifically to the interaction server system 110, an Application Programming Interface (API) server 122 is coupled to and provides programmatic interfaces to interaction servers 124, making the functions of the interaction servers 124 accessible to interaction clients 104, other applications 106 and third-party server 112. The interaction servers 124 are communicatively coupled to a database server 126, facilitating access to a database 128 that stores data associated with interactions processed by the interaction servers 124. Similarly, a web server 130 is coupled to the interaction servers 124 and provides web-based interfaces to the interaction servers 124. To this end, the web server 130 processes incoming network requests over the Hypertext Transfer Protocol (HTTP) and several other related protocols.

The API server 122 receives and transmits interaction data (e.g., commands and message payloads) between the interaction servers 124 and the user systems 102 (and, for example, interaction clients 104 and other application 106) and the third-party server 112. Specifically, the API server 122 provides a set of interfaces (e.g., routines and protocols) that can be called or queried by the interaction client 104 and other applications 106 to invoke functionality of the interaction servers 124. The API server 122 exposes various functions supported by the interaction servers 124, including account registration; login functionality; the sending of interaction data, via the interaction servers 124, from a particular interaction client 104 to another interaction client 104; the communication of media files (e.g., images or video) from an interaction client 104 to the interaction servers 124 or vice versa; the settings of a collection of media data (e.g., a story); the retrieval of a list of friends of a user of a user system 102; the retrieval of messages and content; the addition and deletion of entities (e.g., friends) to an entity graph (e.g., a social graph); customizing entity relationships; customizing user profile data; the location of friends within a social graph; and opening an application event (e.g., relating to the interaction client 104).

The interaction servers 124 host multiple systems and subsystems, described below with reference to FIG. 2.

System Architecture

Figure 2:
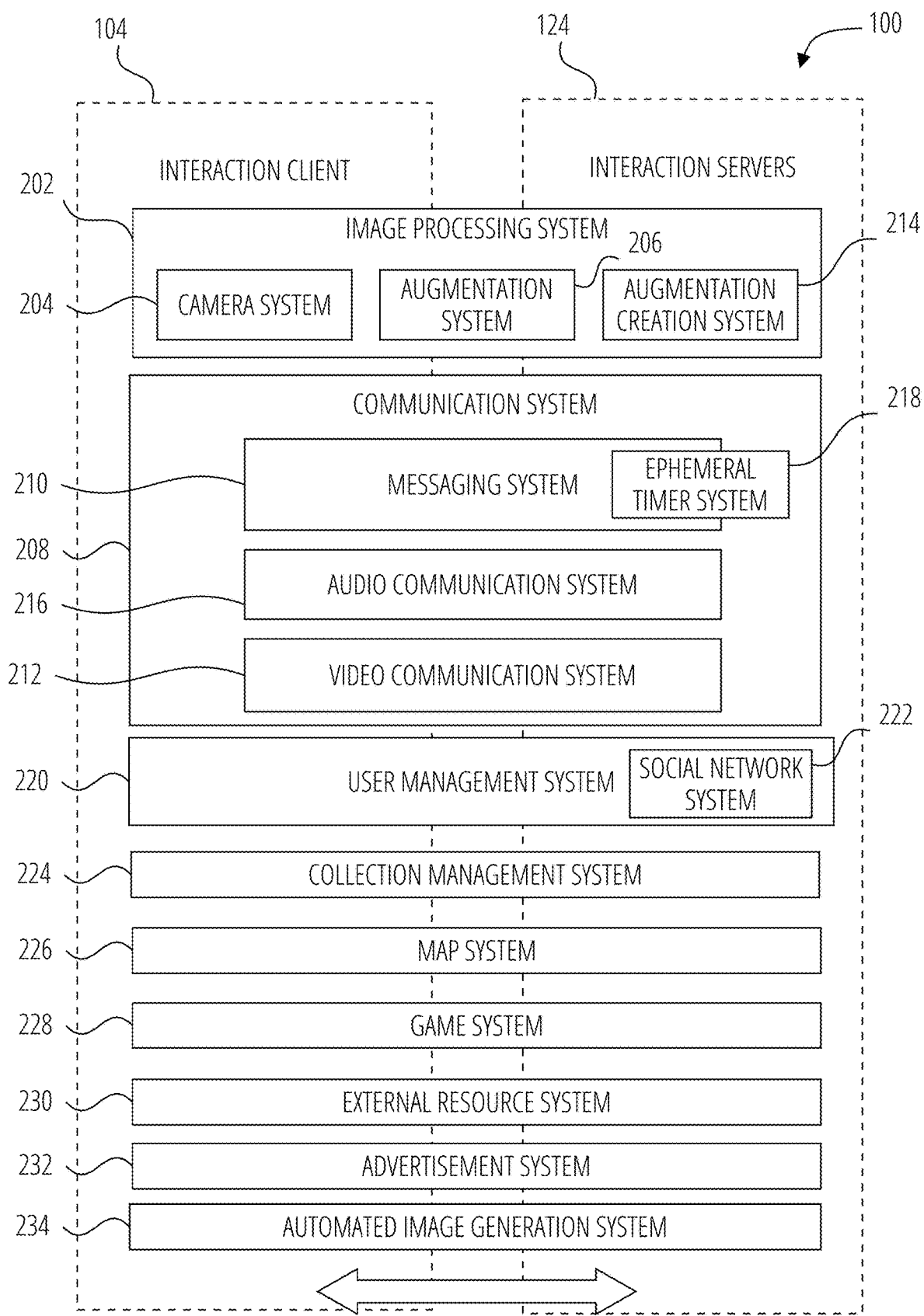
FIG. 2 is a diagrammatic representation of an interaction system, according to some examples, that has both client-side and server-side functionality.

FIG. 2 is a block diagram illustrating further details regarding the interaction system 100, according to some examples. Specifically, the interaction system 100 is shown to comprise the interaction client 104 and the interaction servers 124. The interaction system 100 embodies multiple subsystems, which are supported on the client-side by the interaction client 104 and on the server-side by the interaction servers 124. Example subsystems are discussed below.

An image processing system 202 provides various functions that enable a user to capture and augment (e.g., annotate or otherwise modify or edit) media content associated with a message. A camera system 204 includes control software (e.g., in a camera application) that interacts with and controls hardware camera hardware (e.g., directly or via operating system controls) of the user system 102 to modify and augment real-time images captured and displayed via the interaction client 104.

The augmentation system 206 provides functions related to the generation and publishing of augmentations (e.g., media overlays) for images captured in real-time by cameras of the user system 102 or retrieved from memory of the user system 102. For example, the augmentation system 206 operatively selects, presents, and displays media overlays (e.g., an image filter or an image lens) to the interaction client 104 for the augmentation of real-time images received via the camera system 204 or stored images retrieved from memory 2502 of a user system 102. These augmentations are selected by the augmentation system 206 and presented to a user of an interaction client 104, based on a number of inputs and data, such as for example:

Geolocation of the user system 102; and
Social network information of the user of the user system 102.

An augmentation may include audio and visual content and visual effects. Examples of audio and visual content include pictures, texts, logos, animations, and sound effects.

An example of a visual effect includes color overlaying. The audio and visual content or the visual effects can be applied to a media content item (e.g., a photo or video) at the user system 102 for communication in a message, or applied to video content, such as a video content stream or feed transmitted from an interaction client 104. As such, the image processing system 202 may interact with, and support, the various subsystems of the communication system 208, such as the messaging system 210 and the video communication system 212.

In some examples, automatically generated images or videos may be displayed as, or used in, augmentations applied by the augmentation system 206 to media content items captured or selected by a user. Examples of such augmentations are described with reference to FIG. 18 to FIG. 21 below.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing system 202 uses the geolocation of the user system 102 to identify a media overlay that includes the name of a merchant at the geolocation of the user system 102. The media overlay may include other indicia associated with the merchant. The media overlays may be stored in the databases 128 and accessed through the database server 126. In some examples, media overlays may be generated or modified using the automated image generation system 234 described below.

The image processing system 202 provides a user-based publication platform that enables users to select a geolocation on a map and upload content associated with the selected geolocation. The user may also specify circumstances under which a particular media overlay should be offered to other users. The image processing system 202 generates a media overlay that includes the uploaded content and associates the uploaded content with the selected geolocation.

The augmentation creation system 214 supports augmented reality developer platforms and includes an application for content creators (e.g., artists and developers) to create and publish augmentations (e.g., augmented reality experiences) of the interaction client 104. The augmentation creation system 214 provides a library of built-in features and tools to content creators including, for example custom shaders, tracking technology, and templates.

In some examples, the augmentation creation system 214 provides a merchant-based publication platform that enables merchants to select a particular augmentation associated with a geolocation via a bidding process. For example, the augmentation creation system 214 associates a media overlay of the highest bidding merchant with a corresponding geolocation for a predefined amount of time.

A communication system 208 is responsible for enabling and processing multiple forms of communication and interaction within the interaction system 100 and includes a messaging system 210, an audio communication system 216, and a video communication system 212. The messaging system 210 is responsible for enforcing the temporary or time-limited access to content by the interaction clients 104. The messaging system 210 incorporates multiple timers (e.g., within an ephemeral timer system 218) that, based on duration and display parameters associated with a message or collection of messages (e.g., a story), selectively enable access (e.g., for presentation and display) to messages and associated content via the interaction client 104. Further details regarding the operation of the ephemeral timer system 218 are provided below. The audio communication system 216 enables and supports audio communications (e.g., real-time audio chat) between multiple interaction clients 104. Similarly, the video communication system 212 enables and supports video communications (e.g., real-time video chat) between multiple interaction clients 104.

A user management system 220 is operationally responsible for the management of user data and profiles, and may include a social network system 222 that maintains information regarding relationships between users of the interaction system 100. The user management system 220 may be responsible for associating images with user profiles and linking specific images to multiple user profiles. For example, an automatically generated image may be associated with a first user profile of a first user and with a second user profile of a second user such that, when either of these users opens a conversation window (or interaction interface) to communicate with the other user via the interaction client 104, the image is caused to be presented by the user management system 220, e.g., as a background/wallpaper.

A collection management system 224 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 224 may also be responsible for publishing an icon that provides notification of a particular collection to the user interface of the interaction client 104. The collection management system 224 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 224 employs machine vision (or image recognition technology) and content rules to curate a content collection automatically. In certain examples, compensation may be paid to a user to include user-generated content into a collection. In such cases, the collection management system 224 operates to automatically make payments to such users to use their content.

A map system 226 provides various geographic location functions and supports the presentation of map-based media content and messages by the interaction client 104. For example, the map system 226 enables the display of user icons or avatars (e.g., stored in profile data 302) on a map to indicate a current or past location of "friends" of a user, as well as media content (e.g., collections of messages including photographs and videos) generated by such friends, within the context of a map. For example, a message posted by a user to the interaction system 100 from a specific geographic location may be displayed within the context of a map at that particular location to "friends" of a specific user on a map interface of the interaction client 104. A user can furthermore share his or her location and status information (e.g., using an appropriate status avatar) with other users of the interaction system 100 via the interaction client 104, with this location and status information being similarly displayed within the context of a map interface of the interaction client 104 to selected users.

A game system 228 provides various gaming functions within the context of the interaction client 104. The interaction client 104 provides a game interface providing a list of available games that can be launched by a user within the context of the interaction client 104 and played with other users of the interaction system 100. The interaction system 100 further enables a particular user to invite other users to participate in the play of a specific game by issuing invitations to such other users from the interaction client 104. The interaction client 104 also supports audio, video, and text messaging (e.g., chats) within the context of gameplay, provides a leaderboard for the games, and also supports the provision of in-game rewards (e.g., coins and items).

An external resource system 230 provides an interface for the interaction client 104 to communicate with remote servers (e.g., third-party servers 112) to launch or access external resources, i.e., applications or applets. Each third-party server 112 hosts, for example, a markup language (e.g., HTML5) based application or a small-scale version of an application (e.g., game, utility, payment, or ride-sharing application). The interaction client 104 may launch a web-based resource (e.g., application) by accessing the HTML5 file from the third-party servers 112 associated with the web-based resource. Applications hosted by third-party servers 112 are programmed in JavaScript leveraging a Software Development Kit (SDK) provided by the interaction servers 124. The SDK includes Application Programming Interfaces (APIs) with functions that can be called or invoked by the web-based application. The interaction servers 124 host a JavaScript library that provides a given external resource access to specific user data of the interaction client 104. HTML5 is an example of technology for programming games, but applications and resources programmed based on other technologies can be used.

To integrate the functions of the SDK into the web-based resource, the SDK is downloaded by the third-party server 112 from the interaction servers 124 or is otherwise received by the third-party server 112. Once downloaded or received, the SDK is included as part of the application code of a web-based external resource. The code of the web-based resource can then call or invoke certain functions of the SDK to integrate features of the interaction client 104 into the web-based resource.

The SDK stored on the interaction server system 110 effectively provides the bridge between an external resource (e.g., applications 106 or applets) and the interaction client 104. This gives the user a seamless experience of communicating with other users on the interaction client 104 while also preserving the look and feel of the interaction client 104. To bridge communications between an external resource and an interaction client 104, the SDK facilitates communication between third-party servers 112 and the interaction client 104. A WebViewJavaScriptBridge running on a user system 102 establishes two one-way communication channels between an external resource and the interaction client 104. Messages are sent between the external resource and the interaction client 104 via these communication channels asynchronously. Each SDK function invocation is sent as a message and callback. Each SDK function is implemented by constructing a unique callback identifier and sending a message with that callback identifier.

By using the SDK, not all information from the interaction client 104 is shared with third-party servers 112. The SDK limits which information is shared based on the needs of the external resource. Each third-party server 112 provides an HTML5 file corresponding to the web-based external resource to interaction servers 124. The interaction servers 124 can add a visual representation (such as a box art or other graphic) of the web-based external resource in the interaction client 104. Once the user selects the visual representation or instructs the interaction client 104 through a GUI of the interaction client 104 to access features of the web-based external resource, the interaction client 104 obtains the HTML5 file and instantiates the resources to access the features of the web-based external resource.

The interaction client 104 presents a graphical user interface (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another graphical user interface of the external resource that includes functions and features of the external resource. In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an OAuth 2 framework.

The interaction client 104 controls the type of user data that is shared with external resources based on the type of external resource being authorized. For example, external resources that include full-scale applications (e.g., an application 106) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 232 operationally enables the purchasing of advertisements by third parties for presentation to end-users via the interaction clients 104 and also handles the delivery and presentation of these advertisements.

An automated image generation system 234 enables a user to receive an automatically generated image in response to submission of a prompt via the interaction client 104. The automated image generation system 234 causes generation of an image (or multiple images) corresponding to the prompt. This can be referred to as a text-guided, automatic image generation feature. Image generation may be performed using various AI-driven image generation techniques. For example, the automated image generation system 234 may include an automated image generator providing a text-to-image machine learning model, or may be communicatively coupled to a third-party automated image generator.

In some examples, the automated image generation system 234 is also responsible for content checking or filtering, e.g., checking a prompt for objectionable language before allowing an image to be generated. In some examples, the automated image generation system 234 provides an automatic prompt generation feature by enabling a user to request a prompt, e.g., a sample text prompt or a suggested text prompt, in response to which the automated image generation system 234 automatically generates and presents a prompt to the user.

Data Architecture

Figure 3:
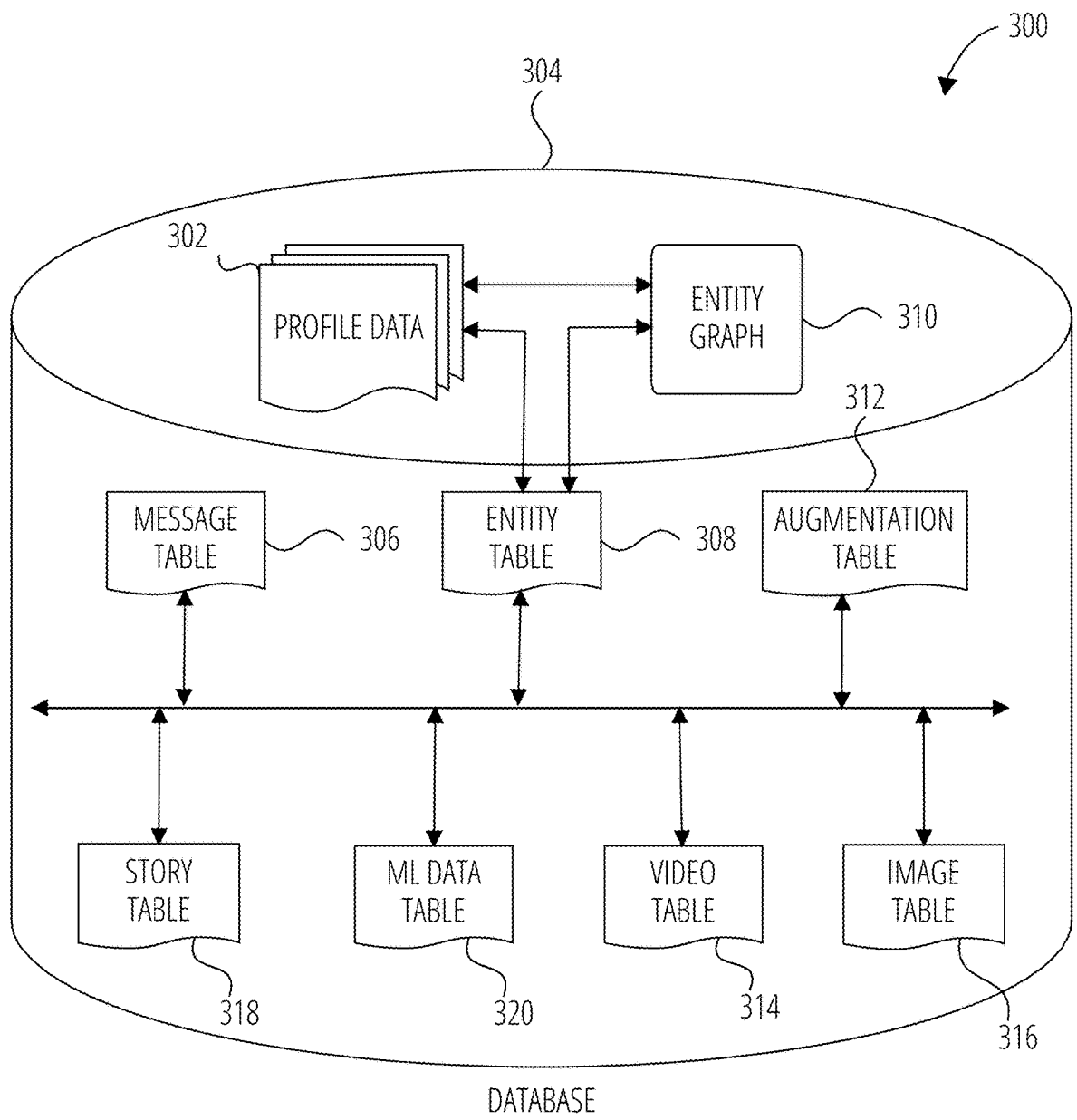
FIG. 3 is a diagrammatic representation of a data structure as maintained in a database, according to some examples.

FIG. 3 is a schematic diagram illustrating data structures 300, which may be stored in the database 304 of the interaction server system 110, according to certain examples. While the content of the database 304 is shown to comprise multiple tables, it will be appreciated that the data could be stored in other types of data structures (e.g., as an object-oriented database).

The database 304 includes message data stored within a message table 306. This message data includes, for any particular message, at least message sender data, message recipient (or receiver) data, and a payload. Further details regarding information that may be included in a message, and included within the message data stored in the message table 306, are described below with reference to FIG. 24.

An entity table 308 stores entity data, and is linked (e.g., referentially) to an entity graph 310 and profile data 302. Entities for which records are maintained within the entity table 308 may include individuals, corporate entities, organizations, objects, places, events, and so forth. Regardless of entity type, any entity regarding which the interaction server system 110 stores data may be a recognized entity. Each entity is provided with a unique identifier, as well as an entity type identifier (not shown).

The entity graph 310 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 100.

Certain permissions and relationships may be attached to each relationship, and also to each direction of a relationship. For example, a bidirectional relationship (e.g., a friend relationship between individual users) may include authorization for the publication of digital content items between the individual users, but may impose certain restrictions or filters on the publication of such digital content items (e.g., based on content characteristics, location data or time of day data). Similarly, a subscription relationship between an individual user and a commercial user may impose different degrees of restrictions on the publication of digital content from the commercial user to the individual user, and may significantly restrict or block the publication of digital content from the individual user to the commercial user. A particular user, as an example of an entity, may record certain restrictions (e.g., by way of privacy settings) in a record for that entity within the entity table 308. Such privacy settings may be applied to all types of relationships within the context of the interaction system 100, or may selectively be applied to certain types of relationships.

The profile data 302 stores multiple types of profile data about a particular entity. The profile data 302 may be selectively used and presented to other users of the interaction system 100 based on privacy settings specified by a particular entity or based on associations created between user profiles. Where the entity is an individual, the profile data 302 includes, for example, a user name, telephone number, address, settings (e.g., notification and privacy settings), as well as a user-selected avatar representation (or collection of such avatar representations). The profile data 302 may also include profile images, user background images, or the like. One or more of these images may be generated using the automated image generation system 234 described below and linked to a user, or to a relationship between users, by the user management system 220.

A particular user may selectively include one or more of these images or avatar representations within the content of messages communicated via the interaction system 100, and on map interfaces displayed by interaction clients 104 to other users. A collection of avatar representations may include "status avatars," which present a graphical representation of a status or activity that the user may select to communicate at a particular time.

Where the entity is a group, the profile data 302 for the group may similarly include one or more avatar representations associated with the group, in addition to the group name, members, and various settings (e.g., notifications) for the relevant group.

The database 304 also stores augmentation data, such as overlays or filters, in an augmentation table 312. The augmentation data is associated with and applied to videos (for which data is stored in a video table 314) and images (for which data is stored in an image table 316).

Filters, in some examples, are overlays that are displayed as overlaid on an image or video during presentation to a recipient user. Filters may be of various types, including user-selected filters from a set of filters presented to a sending user by the interaction client 104 when the sending user is composing a message. Other types of filters include geolocation filters (also known as geo-filters), which may be presented to a sending user based on geographic location. For example, geolocation filters specific to a neighborhood or special location may be presented within a user interface by the interaction client 104, based on geolocation information determined by a Global Positioning System (GPS) unit of the user system 102.

Another type of filter is a data filter, which may be selectively presented to a sending user by the interaction client 104 based on other inputs or information gathered by the user system 102 during the message creation process. Examples of data filters include current temperature at a specific location, a current speed at which a sending user is traveling, battery life for a user system 102, or the current time.

Other augmentation data that may be stored within the image table 316 includes augmented reality content items (e.g., corresponding to applying "lenses" or augmented reality experiences). An augmented reality content item may be a real-time special effect and sound that may be added to an image or a video.

A story table 318 stores data regarding collections of messages and associated image, video, or audio data, which are compiled into a collection (e.g., a story or a gallery). The creation of a particular collection may be initiated by a particular user (e.g., each user for which a record is maintained in the entity table 308). A user may create a "personal story" in the form of a collection of content that has been created and sent/broadcast by that user. To this end, the user interface of the interaction client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the interaction client 104, to contribute content to a particular live story. The live story may be identified to the user by the interaction client 104, based on his or her location. The end result is a "live story" told from a community perspective.

A further type of content collection is known as a "location story," which enables a user whose user system 102 is located within a specific geographic location (e.g., on a college or university campus) to contribute to a particular collection. In some examples, a contribution to a location story may employ a second degree of authentication to verify that the end-user belongs to a specific organization or other entity (e.g., is a student on the university campus).

As mentioned above, the video table 314 stores video data that, in some examples, is associated with messages for which records are maintained within the message table 306. Similarly, the image table 316 stores image data associated with messages for which message data is stored in the entity table 308. The entity table 308 may associate various augmentations from the augmentation table 312 with various images and videos stored in the image table 316 and the video table 314. The image table 316 may further store image data, such as images generated by an automated image generator or automatically generated images used in augmentation functions, as described further below.

The machine learning (ML) data table 320 stores data relating to one or more machine learning models. The data relating to a machine learning model can include training data, e.g., training data sets or fine-tuning data sets. The data may further include one or more of test data, model parameters, evaluation metrics, hyperparameters, feature and target data and metadata, data preprocessing settings, model architecture data, or version history data. Example machine learning models are described below.

Figure 4:
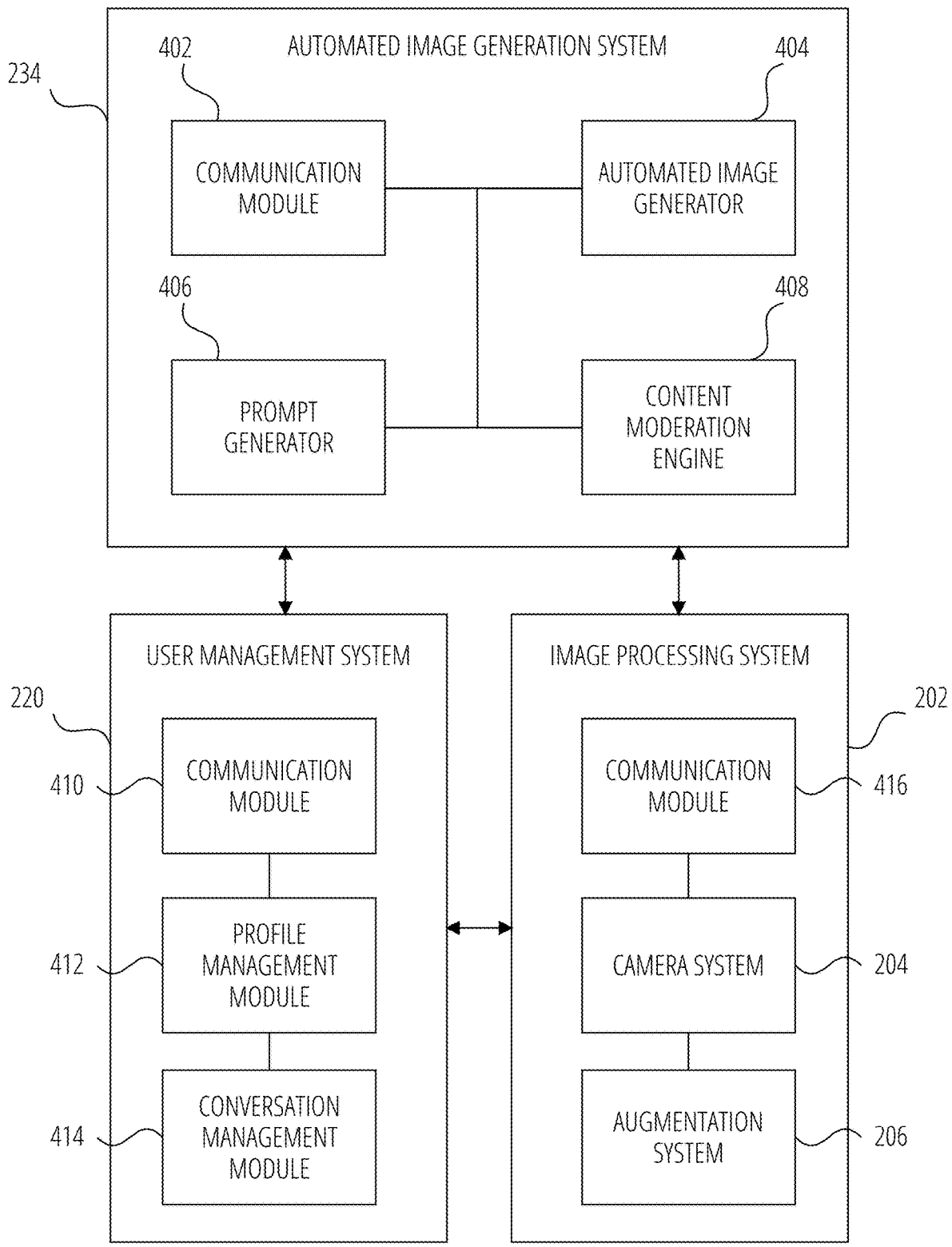
FIG. 4 is a block diagram illustrating certain components of an automated image generation system, of a user management system, and of an image processing system, according to some examples.

FIG. 4 is a block diagram illustrating certain components of the automated image generation system 234, the user management system 220, and the image processing system 202, according to some examples. FIG. 4 illustrates only certain components of the automated image generation system 234, user management system 220, and image processing system 202 to illustrate functions and methodologies relating to examples of the present disclosure, and accordingly may omit certain other components.

Any one or more of the modules (which may also be referred to as components) described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various examples, modules described herein as being implemented within a single machine, database, or device may be distributed across multiple machines, databases, or devices.

Turning now specifically to FIG. 4, the automated image generation system 234 comprises a communication module 402, an automated image generator 404, a processor-implemented prompt generator 406, and a processor-implemented content moderation engine 408.

The communication module 402 is responsible for enabling the automated image generation system 234 to access data, such as prompts and other input provided by a user, and to transmit data, such as output images to be provided to the user. The communication module 402 also allows the automated image generation system 234 to communicate with other components, such as the user management system 220, the image processing system 202, or external components.

In some examples, certain processes relating to automated image generation are performed by external components (external to the interaction system 100), and the communication module 402 may communicate with these external components. For example, one or more image generation, image analysis or image processing functions may be provided by a third-party or other external component or service, and the communication module 402 may facilitate communications to and from such external component or service. The communication module 402 may also communicate with the database 128 of the interaction system 100, e.g., to cause storage or retrieval of data relevant to the automated image generation system 234.

The automated image generator 404 implements one or more automated text-to-image generators, e.g., one or more text-to-image machine learning models. While the automated image generation system 234 is shown in examples as being part of an interaction system such as the interaction system 100, in other examples the automated image generation system 234 can form part of other systems, such as content generation systems, content editing systems, or AI services, that may not necessarily provide user interaction features as described with reference to the interaction system 100.

In examples described below with reference to FIG. 5 to FIG. 21, a text-to-image machine learning model in the example form of a diffusion model is employed by the automated image generation system 234 to generate images. A diffusion model is a type of generative machine learning model that can be used to generate images from a given text prompt. It is based on the concept of "diffusing" noise throughout an image to transform it gradually into a new image. A diffusion model may use a sequence of invertible transformations to transform a random noise image into a final image. During training, a diffusion model may learn sequences of transformations that can best transform random noise images into desired output images. A diffusion model can be fed with input data (e.g., a text describing the desired images and the corresponding output images), and the parameters of the model are adjusted iteratively to improve its ability to generate accurate or good quality images.

Once trained, in order to generate an image, the diffusion model uses a text prompt as input and applies the trained sequence of transformations to generate an output image. The model generates the image in a step-by-step manner, updating the image sequentially with additional information until the image is fully generated. This process may be repeated to produce a set of candidate images, from which the final image is chosen based on criteria such as a likelihood score. The resulting image is intended to represent a visual interpretation of the text prompt.

While certain examples described herein utilize a diffusion-based model to generate images, other types of models may be employed to generate images in other examples, such as GANs, Variational Autoencoders (VAEs), autoregressive models, or other neural networks.

Generally, in order to train a model to provide one or more functionality as described in examples of the present disclosure, training data in the form of prompts, images, and metadata may be used. A training data set for a generative model may include thousands or millions of AI-generated images paired with the prompts that produced them.

In some examples, the training data set may also include, for each image, a caption generated by an automated caption generator, such as an image-to-text model. These captions may be used in the training process. A caption can, for example, be automatically generated for an image using a multimodal encoder-decoder.

A multimodal encoder-decoder may be based, for example, on a BLIP (Bootstrapping Language-Image Processing) model architecture which comprises the following functional components: a unimodal encoder, an image-grounded text encoder, and an image-grounded text decoder. The multimodal encoder-decoder provides a unified model for vision-language understanding and generation. The multimodal encoder-decoder module can operate in one of three functionalities using its different functional components (the unimodal encoder, the image-grounded text encoder, or the image-grounded text decoder).

One or more of the functionalities of a multimodal encoder-decoder module may be used to implement methodologies described herein, such as image encoding, text encoding, and caption generation. However, the multimodal encoder-decoder architecture described above is merely an example, and other types of encoders, decoders, text generators, caption predictors, and the like, whether separated or incorporated into a single system, may be used in some examples.

As used in this disclosure, the term "machine learning model" (or simply "model") may refer to a single, stand-alone model, or a combination of models. The term may also refer to a system or module that includes a machine learning model together with one or more supporting or supplementary components that do not necessarily perform machine learning tasks.

Returning to FIG. 4, the automated image generation system 234 may implement the prompt generator 406 to allow a user to request a prompt, e.g., a sample text prompt or a suggested text prompt, in response to which the automated image generation system 234 automatically generates and presents a prompt to the user. The user can use such a prompt as a starting point (or as inspiration) to create a final prompt, or may submit such a prompt directly for image generation.

The automated image generation system 234 may be configured to prohibit the user from generating images based on objectionable, sensitive or unwanted content. To this end, the content moderation engine 408 is used to automatically check and filter prompts containing unwanted text objects, or with a context or meaning that is determined to be objectionable this type of prompt may be referred to as a "restricted prompt." Restricted prompts may be rejected and/or modified prior to image generation, as described further below.

The content moderation engine 408 may use various techniques to detect potentially problematic or objectionable content, such as natural language processing, sentiment analysis, and image recognition. For example, the content moderation engine 408 may analyze a prompt that includes text referring to violence, hate speech, or explicit sexual content. The content moderation engine 408 may also detect patterns of behavior or user history that suggest a likelihood of generating objectionable content and use machine learning algorithms to continuously improve its ability to detect objectionable content.

Once objectionable content is detected and a prompt is thus determined to be a "restricted prompt," the content moderation engine 408 may take different actions, depending, for example, on the severity of the content. For instance, the content moderation engine 408 may reject the entire input prompt or modify it by replacing specific words or phrases with more appropriate ones. In other words, the restricted prompt may be adapted such that it is no longer classified as "restricted," and the adapted prompt can be passed to the automated image generator 404.

The user management system 220 includes a communication module 410, a profile management module 412, and a conversation management module 414. The communication module 410 allows the user management system 220 to communicate with the automated image generation system 234, e.g., to receive automatically generated images or links to storage locations of these images, or with the image processing system 202, e.g., to provide a stored image associated with a user profile (or link thereto) to be used in an augmentation function.

The profile management module 412 is responsible for the management of user data and profiles, such as user profile images. Changes in profile data, such as the association of an automatically generated image with a user's profile, are stored in the database 128.

The conversation management module 414 is responsible for the management of features of electronic conversations between two or more entities within the interaction system 100. For example, users may customize their electronic conversations by selecting specific images (e.g., a wallpaper), styles, or effects, to be applied in those conversations. These customizations or selections are stored in the database 128. In some examples, the conversation management module 414 is configured to take the relationships between entities into account with respect to the options made available to a user. For example, if a first user and a second user have established a bidirectional ("friend") relationship within the interaction system 100, one of the users may be permitted to select or change an interaction interface wallpaper that is presented when the two users interact with each other in an interaction interface. On the other hand, if the two users have not established a bidirectional relationship, the conversation management module 414 may not make this feature available to the users.

The image processing system 202 also includes a communication module 416 that allows it to communicate with the automated image generation system 234 and the user management system 220, e.g., for implementing the example functionality described above. In some examples, the image processing system 202 receives an automatically generated image from the automated image generation system 234 (and optionally user profile data from the user management system 220), and uses the automatically generated image in the creation or augmentation of a content item in the interaction client 104 of a user, as facilitated by the camera system 204 and the augmentation system 206 described with reference to FIG. 2.

Figure 5:
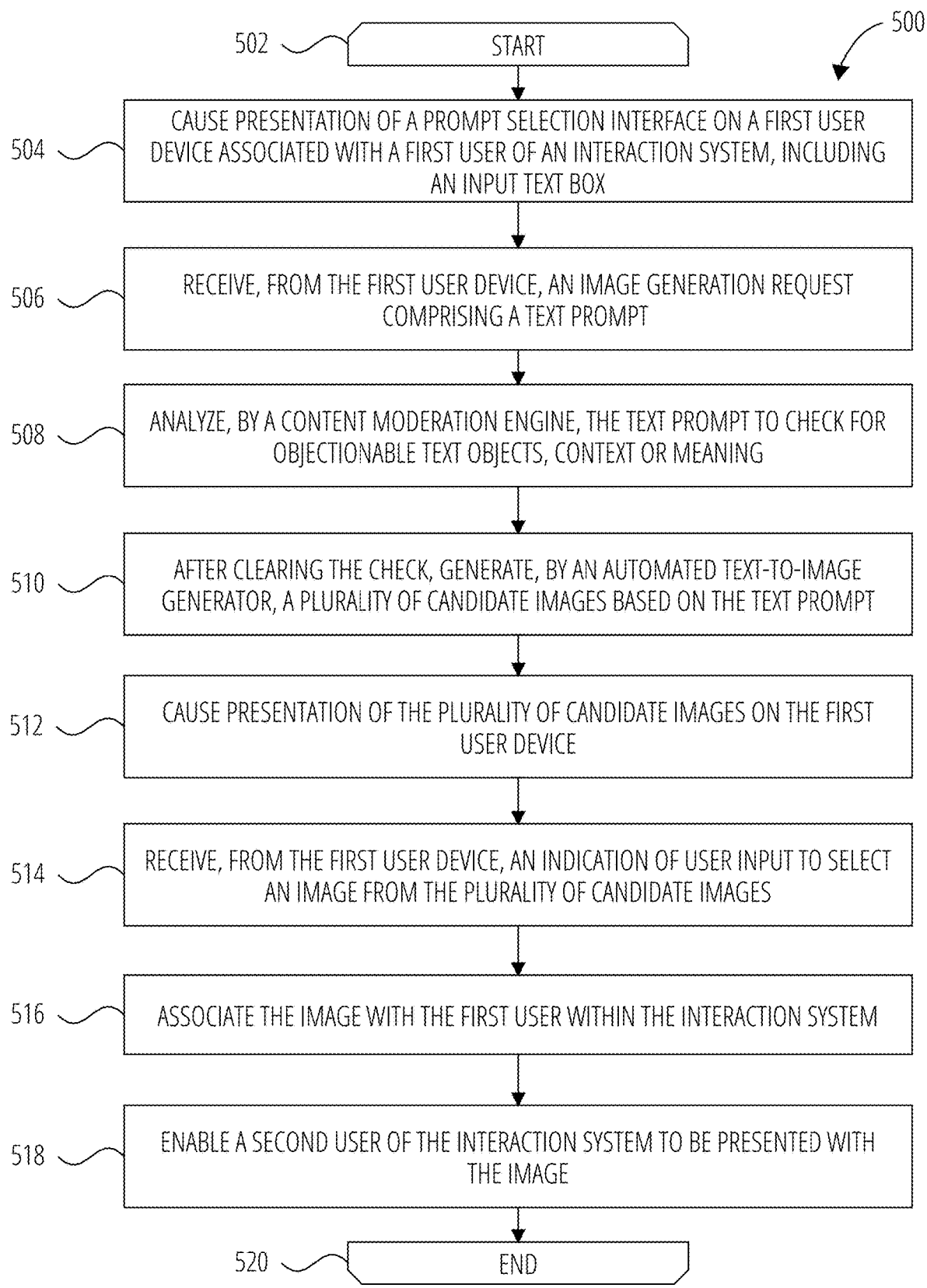
FIG. 5 is a flow diagram illustrating a method that includes automatic image generation and the association of an automatically generated image with a user profile, according to some examples.

FIG. 5 is a flow diagram illustrating a method 500 that includes automatic image generation and the association of an automatically generated image with a user profile, according to some examples. The method 500 may be performed by components of the interaction system 100, including one or more automated text-to-image generators of the automated image generation system 234, the user management system 220, or the image processing system 202.

The method 500 commences at opening loop block 502 and proceeds to block 504, where the interaction system 100 causes presentation of a prompt selection interface on a first user device of a first user. The user may use any suitable user system 102 to access the prompt selection interface, e.g., the user may access the prompt selection interface via the interaction client 104 executing on the mobile device 114 (as an example of the first user device). The prompt selection interface may include a text input section such as an input text box, allowing the user to enter or select the prompt. The prompt may be a sentence describing what the user wants to see in the image. For example, and referring to FIG. 10, the user's prompt may read: "A castle landscape, Middle Ages."

The automated image generation system 234 receives an image generation request originating from the first user device comprising the selected or entered text prompt at block 506. Prior to feeding the text prompt to the automated image generator 404, the content moderation engine 408 analyzes the text prompt to check for objectionable text objects or objectionable meaning/context (block 508). The content moderation engine 408 may be configured to check for specific words or phrases that are not allowable, or may implement a machine learning model that is trained to predict whether the text prompt may include objectionable content, or may lead to objectionable visual output (e.g., based on a predicted meaning or context of the relevant words). In some examples, the content moderation engine 408 automatically scans an incoming prompt using both machine learning techniques, e.g., to predict a meaning or content, and rule-based checks, e.g., to check for specific words that are not allowed in a prompt.

In some examples, if the content moderation engine 408 determines that the text prompt is not allowable within the interaction system 100 (e.g., it is determined to be a restricted prompt), the text prompt may be rejected and a notification of the rejection may be presented to the first user on the first user device. In some examples, the content moderation engine 408 may be configured to modify the text prompt, e.g., to remove objectionable or flagged words, or modify certain words automatically, and then feed the modified prompt to the automated image generator 404.

At block 510, once the above-described check has been performed, and the text prompt has either been determined not to be a restricted prompt or automatically modified to obviate a restriction, the automated image generator 404 receives the text prompt and generates one or more images based on the text prompt. As indicated, the automated image generator 404 can include a text-to-image generator such as a diffusion model that is trained to generate images based on text prompts. In FIG. 5, the automated image generator 404 generates a plurality of candidate images, all based on the same text prompt. The candidate images are then caused to be presented on the first user device (block 512).

The first user is able to view the candidate images on the first user device and select one of them, e.g., by tapping on one of the images and selecting a "submit" or "enter" button. The interaction system 100 then receives, at block 514, an indication of the user input to select the image from the plurality of candidate images. In other words, the user input to select the image identifies the selected image from among the plurality of candidate images initially presented at the first user device.

In response to receiving the indication of the selection, the user management system 220 associates the selected image with the first user within the interaction system 100 (block 516). For example, the user management system 220 may cause the image to be stored in association with a first user profile of the first user. The image may, for example, be stored as a profile image, a wallpaper, an avatar, or the like. Some examples are described below.

Further, in response to receiving the indication of the selection, at block 518, the interaction system 100 enables at least a second user to be presented with the image selected by the first user. For example, if the image is stored as a profile image of the first user, the second user may view a profile of the first user using the interaction client 104 in order to be presented with the image. As another example, the image may be stored as a conversation-specific wallpaper that is displayed in an interaction interface (e.g., "chat" interface) when the first user and the second user communicate via electronic messaging using the interaction client 104. As a further example, the generated image may be included in a media content item that is subsequently published by the first user via the interaction client 104, allowing other users to view and interact with the media content item.

The candidate images that are not selected by the user may be automatically deleted from the interaction system 100 to reduce memory or processing requirements, e.g., immediately, after a period of 24 hours or 48 hours, or any other suitable period, depending on the implementation. The method concludes at closing loop block 520.

FIG. 6 to FIG. 21 illustrate user interface diagrams, according to some examples. Such user interfaces may be presented to a user by an interaction client 104, as an example of an interaction application, executing on a mobile device 114 or other suitable device. While the user interfaces of FIG. 6 to FIG. 21 are shown as being presented on the screen of a mobile device 114, one or more user interfaces may also be presented on the optical display of a head-wearable apparatus 116 or other apparatus presenting a user interface, e.g., "smart contact lenses" or similar technology.

FIG. 6 to FIG. 11 provide a first series of user interface diagrams, illustrating the association of a text-guided, automatically generated image with a user profile. Referring firstly to FIG. 6, the user interface diagram illustrates a profile images interface 600, according to some examples. The profile images interface 600 presents, to a first user, a background image 602 and an avatar 604 of the first user, as used and displayed within the interaction system 100 in association with the first user. For example, when another user views of a profile page of the first user, the background image 602 and avatar 604 are displayed.

The background image 602 shown in FIG. 6 was selected by the user from a set of default backgrounds 612. The first user may, however, wish to obtain a new profile background image and selects the backgrounds tab 606 within the profile images interface 600. User selection of the backgrounds tab 606 causes display of the default backgrounds 612, as well as a prompt button 608 presented above the default backgrounds 612, as shown in FIG. 6. The prompt button 608 incorporates a tooltip in the example form of the following text: "GENERATE FROM ANY PROMPT . . . " This tip alerts the first user of the automated image generation functionality that is available when using the interaction client 104.

A dice element 610 is also depicted on the prompt button 608. This graphical element is intended to alert the first user of "random prompt" generating functionality that is also available when using the interaction client 104, as will be described in greater detail below.

FIG. 7 is a user interface diagram illustrating a prompt selection interface 700, according to some examples. User selection of the prompt button 608 in FIG. 6 causes presentation, to the first user, of the prompt selection interface 700. In order to present the prompt selection interface 700, a prompt selection tray 702 appears and is shown as overlaid on the profile images interface 600.

The prompt selection tray 702 includes an input text box 704 where the user can enter the desired text prompt (e.g., using a touch keyboard 706 or any other suitable input device). Instead of entering a text prompt, the user may select the dice element 708. The dice element 708 is a non-limiting example of an automatic prompt generation element. The dice element 708 is user-selectable to cause automatic generation of a candidate text prompt within the input text box 704. In other words, the user may select the dice element 708 and, in response to receiving an indication of user input to select the dice element 708, the prompt generator 406 may automatically generate a candidate text prompt, and the candidate text prompt may be presented within the input text box 704.

The candidate text prompt may be a "random prompt," as alluded to above, e.g., a random description intended to encourage the user to test the system and express themselves creatively. In some examples, the candidate text prompt is not randomly generated and is generated by analyzing profile data 302 of the user to determine a recommended prompt that the user may be interested in. The candidate text prompt may be submitted by the user for generation of images, used as a starting point in crafting a prompt within the input text box 704, or simply deleted from the input text box 704 if the user does not wish to use it.

The prompt selection tray 702 includes a set of sample text prompts 710. The sample text prompts 710 are intended to provide the user with examples of typical formats, styles and descriptors used to generate images, e.g.: "A planet made out of cheese." In some examples, the sample text prompts 710 are user-selectable buttons. User selection of the sample text prompt 712 from the set of sample text prompts 710 may thus cause the sample text prompt 712 to appear in the input text box 704. Again, the sample text prompt 712 may be submitted by the user, used as a starting point, or simply deleted from the input text box 704 if the user does not wish to use it.

In some examples, user selection of a sample text prompt from the set of sample text prompts 710 automatically causes that sample text prompt to be included in an image generation request that is submitted to the automated image generator 404. In other words, in some cases, the user may select a sample text prompt and automatically receive the generated image(s) corresponding to that prompt, without having to interact with the input text box 704 or select a "submit" or "send" button.

Figure 8:
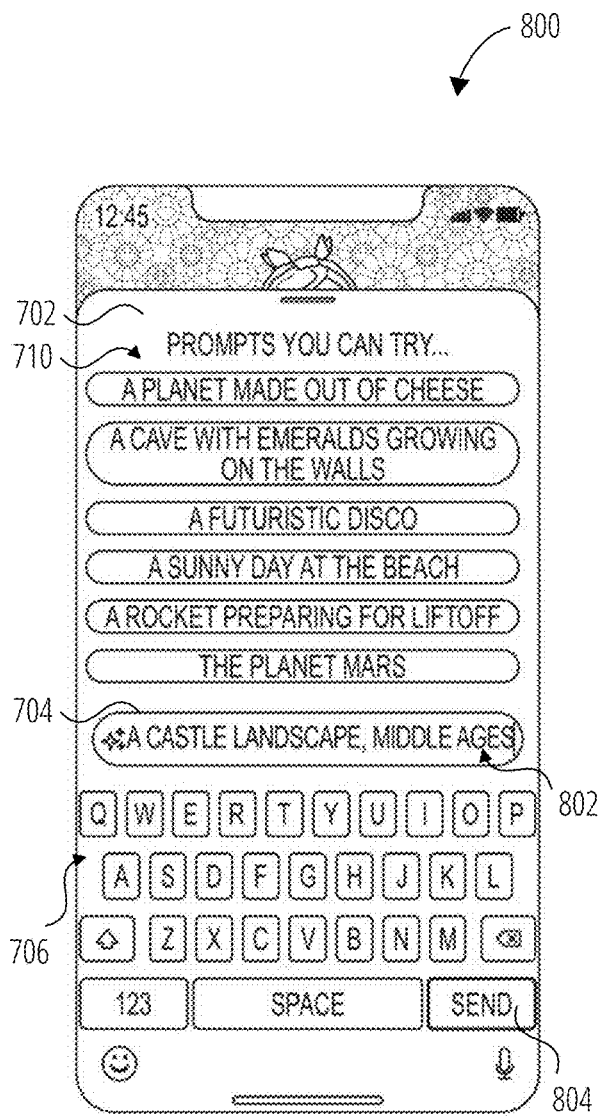
FIG. 8 is a user interface diagram illustrating a prompt selection interface, according to some examples.

FIG. 8 is a user interface diagram illustrating a prompt selection interface 800, according to some examples. The first user decides to use the touch keyboard 706 to enter the following text prompt 802 in the input text box 704: "A castle landscape, Middle Ages." It is noted that the text prompt may include a plurality, and different types, of text objects. In some examples, the text that may be included in the input text box 704 is subject to character limits, as mentioned above.

The user then selects a send button 804 to submit the text prompt. Selection of the send button 804 causes an image generation request, including the text prompt 802, to be transmitted to the automated image generation system 234.

As mentioned above, prior to the generating of images by the automated image generator 404, the content moderation engine 408 may analyze the text prompt 802 and the text prompt may only be transmitted to the automated image generator 404 if the content moderation engine 408 detects that the text prompt does not contain objectionable text objects, or is otherwise permissible, depending on the checking, filtering or moderation methodology employed by the content moderation engine 408.

Figure 9:
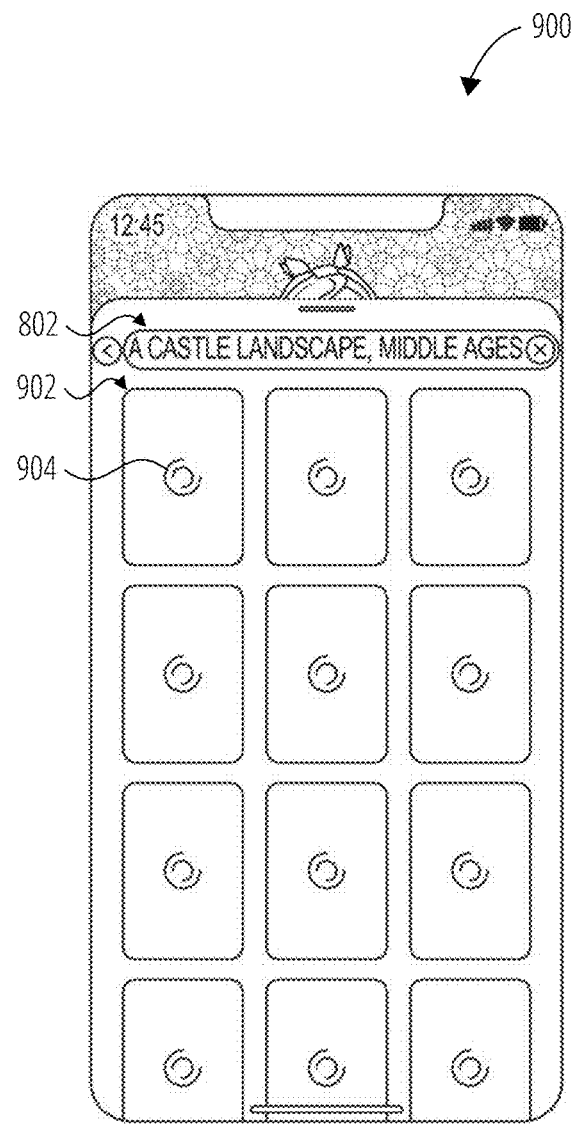
FIG. 9 is a user interface diagram illustrating a loading state of an image selection interface, according to some examples.

FIG. 9 is a user interface diagram illustrating a loading state of an image selection interface 900, according to some examples, which is presented once the text prompt has been transmitted to the automated image generator 404.

The first user is presented with a grid of placeholder images 902, or placeholder cells, while the automated image generator 404 generates the required images based on the text prompt 802. The placeholder images 902 may each display a loading spinner 904 to indicate to the user that the requested images are being generated, retrieved, or loaded.

Figure 10:
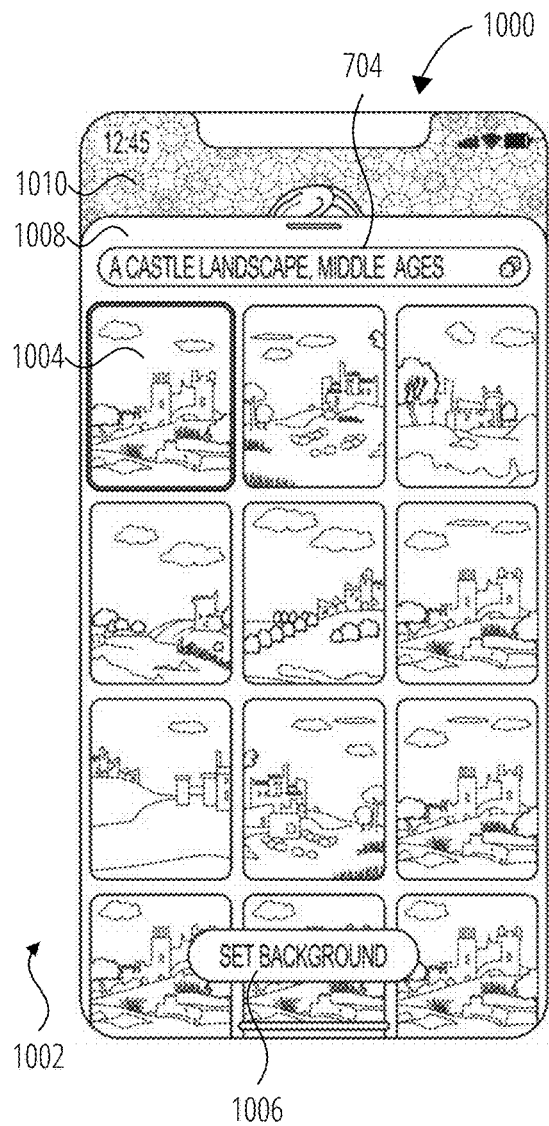
FIG. 10 is a user interface diagram illustrating an image selection interface, according to some examples.

FIG. 10 is a user interface diagram illustrating an image selection interface 1000, according to some examples. The image selection interface 1000 displays a plurality of candidate images 1002, generated by the automated image generator 404 based on the text prompt 802. The candidate images 1002 are arranged in a grid within the image selection interface 1000 to provide the first user with a convenient view of the options available for selection. In some examples, e.g., where the candidate images do not fit the window provided by the mobile device 114, the user may scroll up and down to navigate the candidate images 1002.

In FIG. 10, it is shown that the automated image generator 404 is used to generate multiple variations, or options, based on the same text prompt 802, and these are presented to the user in the image selection interface 1000 as the candidate images 1002. Given that many generative AI tools are probabilistic in nature, they may not produce an exact output for a given input, but rather generate a distribution of possible outputs. In the case of automated image generation, a model may generate multiple images that are all plausible interpretations of the given prompt (as determined by the mode), e.g., with some variation in colors, textures, lighting, or other visual elements. This can provide a user with a useful technological tool to enable selection from several outputs and use of the selected output in a creative manner.

The user can use the image selection interface 1000 to select one of these images as a profile background or submit a new prompt using the input text box 704. Alternatively, the user may dismiss the tray 1008 displaying the candidate images 1002 by, for example, swiping down or tapping in the zone 1010 above the tray 1008 to return to the profile images interface 600.

If the first user does wish to select one of the options, the first user can select (e.g., tap on) the desired option via the image selection interface 1000. In FIG. 10, the user selects the image 1004 (as illustrated by the highlighted border of the image 1004 in FIG. 10) and then selects the set background button 1006. User selection of the set background button 1006 causes presentation of an updated profile images interface 1100 that includes the newly selected image 1004.

Figure 11:
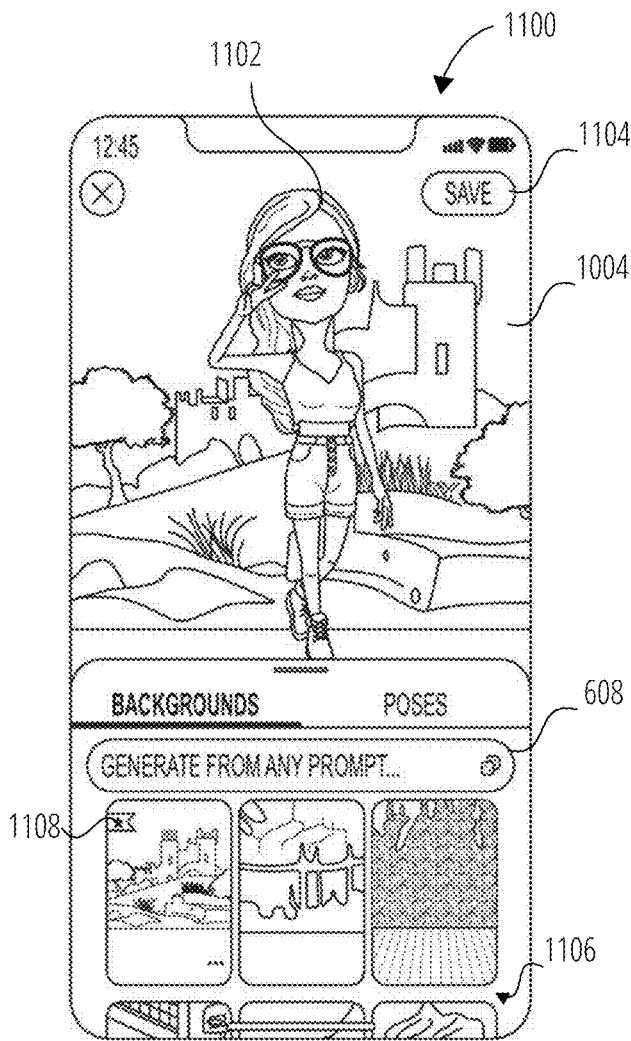
FIG. 11 is a user interface diagram illustrating a profile images interface, including an automatically generated image shown as a user profile background image, according to some examples.

FIG. 11 is a user interface diagram illustrating the updated profile images interface 1100, including the automatically generated image 1004 shown as a user profile background image, according to some examples. Once the user selects the save button 1104 within the profile images interface 1100, the change made to the profile image is stored within the interaction system 100 and the image 1004 becomes visible to at least one second user. In some examples, all other users of the interaction system 100 may be able to view the image 1004. However, this may depend on the first user's privacy settings, e.g., only "friends" of the first user are able to view the image 1004 in some cases.

The user's profile data 302 is updated within the interaction system 100, e.g., by the user management system 220 to include the image 1004 as a profile background, a link thereto, or another indication of the set background. In other words, the image is associated with the first user by storing the image as a user profile image in association with a first user profile of the first user.

The profile images interface 1100 shows the currently selected background in a lower region of the profile images interface 1100, marked with a star icon 1108. From the profile images interface 1100, the user may choose to change the profile background again by selecting a different background from a set of default backgrounds 1106, or generate a new background using the AI-tool. The process may be re-initiated by selecting the prompt button 608 within the profile images interface 1100.

FIG. 12 to FIG. 17 provide a second series of user interface diagrams, illustrating the association of a text-guided, automatically generated image with a first user profile of a first user and with a second user profile of a second user.

Figures 12, 13:
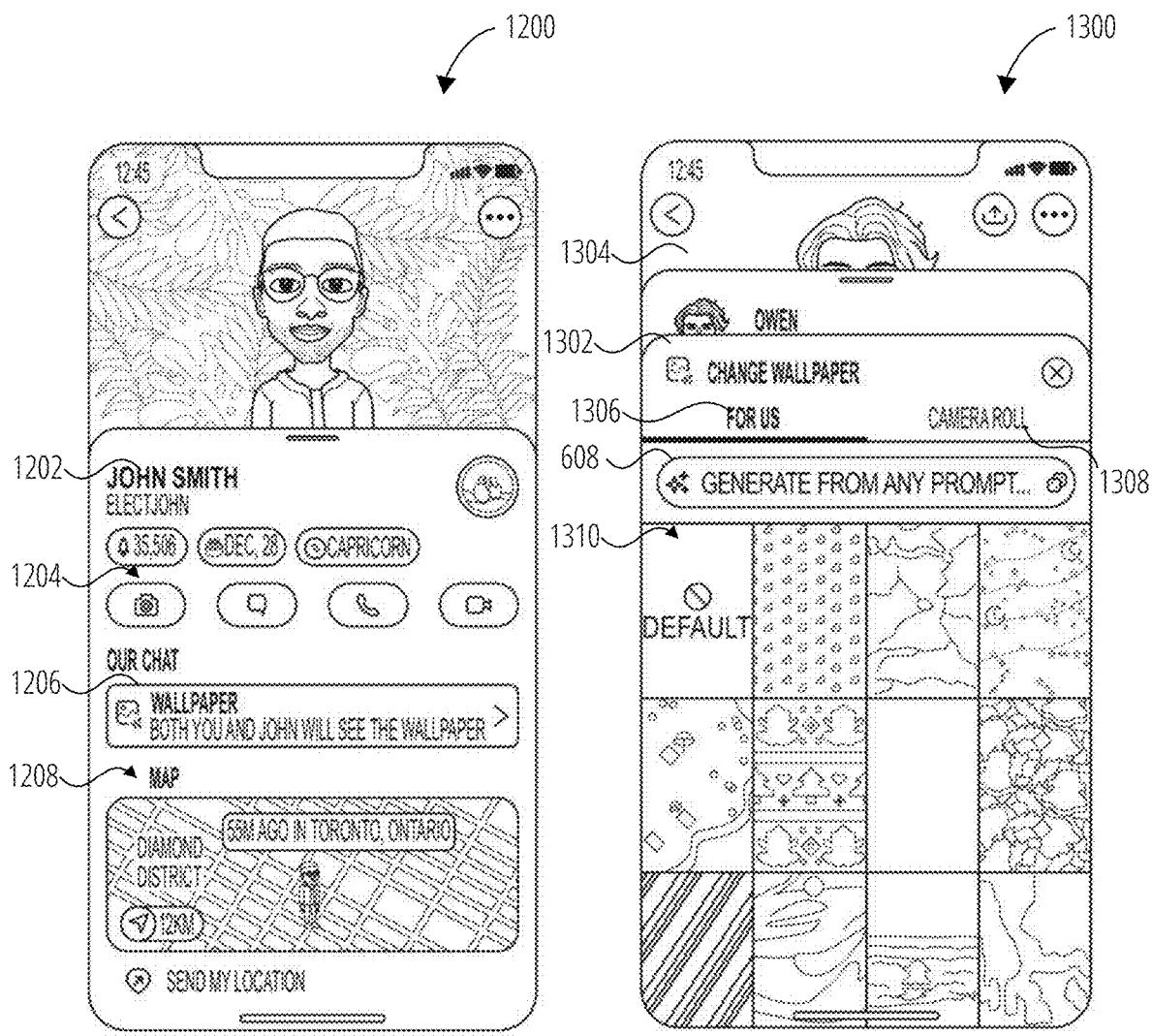
FIG. 12 is a user interface diagram illustrating a user profile interface, according to some examples.
FIG. 13 is a user interface diagram illustrating a wallpaper selection interface, according to some examples.

FIG. 12 is a user interface diagram illustrating a user profile interface 1200, according to some examples. The user profile interface 1200 is accessed by a second user of the interaction system 100 ("Owen"), e.g., using the interaction client 104, to view profile information of and relationship settings relating to a first user, "John Smith." The user profile interface 1200 includes several sections, such as user details 1202, a set of user-selectable interaction options 1204 (allowing the second user to interact with the first user, e.g., via text message or a video call). A map section 1208 is presented in a lower region of the user profile interface 1200, displaying location data of the first user.

The user profile interface 1200 further includes a user-selectable wallpaper selection button 1206. User selection of the wallpaper selection button 1206 invokes a conversation-specific wallpaper feature of the interaction client 104. This feature allows two (or more) users to be presented with a custom wallpaper in an interaction interface when they communicate with each other using the interaction client 104, e.g., via text messages.

Such wallpapers are conversation-specific in that they are linked to specific user pairs, or sets of users (where a group of users participate in an electronic conversation). While the examples described with reference to FIG. 12 to FIG. 17 relate to "chats" between two users, it will be appreciated that features and methodologies described herein may also be applied to "group chats" that include more than two users.

Figure 22:
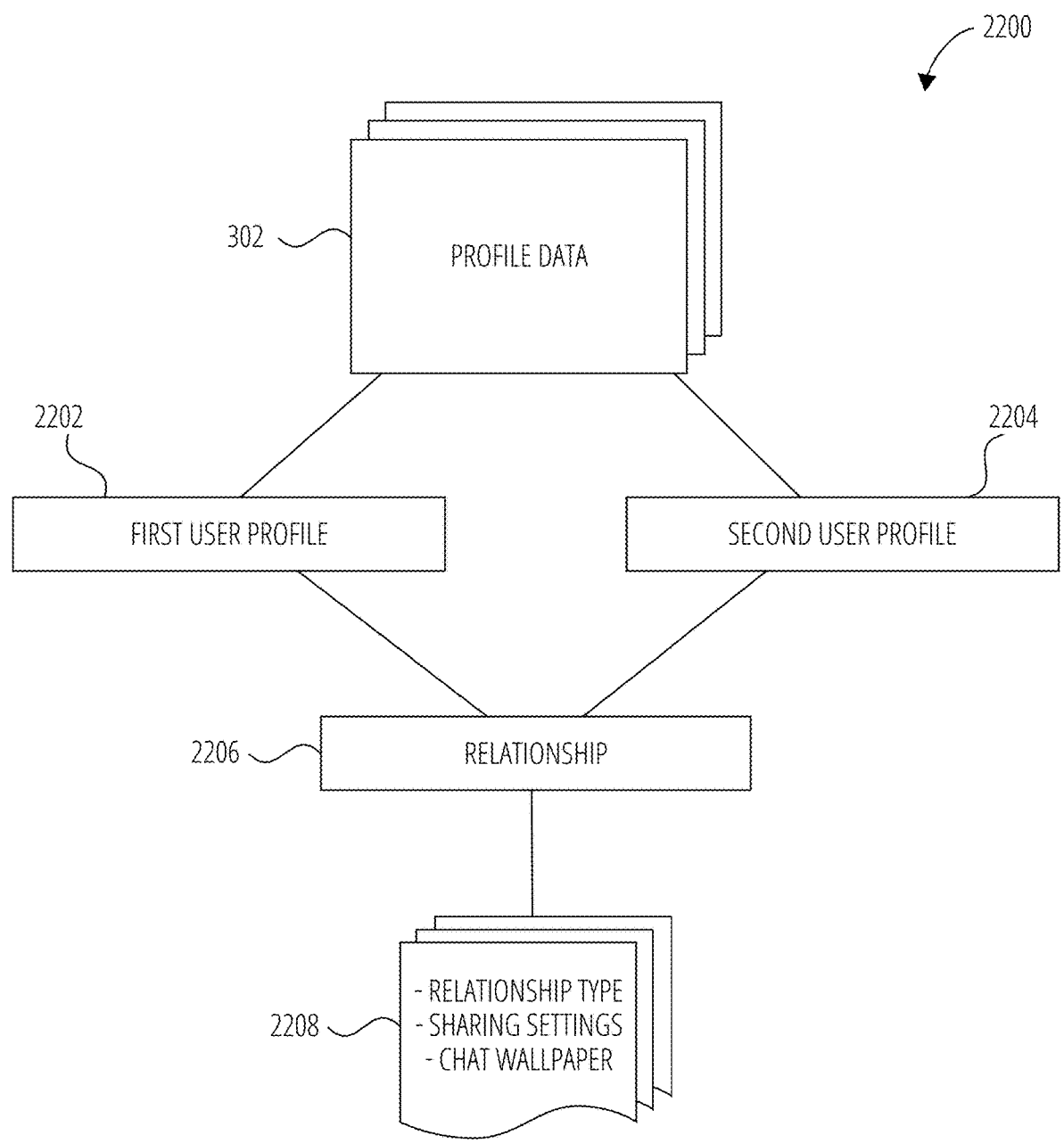
FIG. 22 is a diagrammatic illustration of the association of an image with a first user profile of a first user and a second user profile of a second user.

In some examples, these associations, or links, are stored within the interaction system 100. For example, and as shown in the diagram 2200 of FIG. 22, profile data 302 may include a first user profile 2202 for the first user and a second user profile 2204 for the second user. A relationship 2206 (e.g., as stored in the entity table 308) may regulate the interactions between the two users within the interaction system 100. This may include relationship data 2208, such as data specifying the relationship type, sharing settings, and data indicating that a specified wallpaper, or background, has been selected for messaging interactions between the first user and the second user.

Returning to FIG. 12, the wallpaper selection button 1206 is shown in an "Our Chat" section, because it is actionable to define or adjust settings relating to personal "chats" between the two users in question. The wallpaper selection button 1206 further includes subtext informing the viewing user that, if a customized wallpaper is selected, it will be seen by both the first user and the second user ("Both you and John will see the wallpaper"). This feature may allow for greater customization (particularly when coupled with generative AI wallpapers, as described below), making each conversation feel personalized and allowing users to express themselves in a creative manner using software systems.

Merely as an example, the first user ("John Smith") accesses the user profile of the second user ("Owen") and selects the wallpaper selection button (e.g., by tapping it). In other words, the first user decides to change a chat wallpaper that is applied in interactions between these two users.

The interaction client 104 causes a transition to a wallpaper selection interface. FIG. 13 is a user interface diagram illustrating a wallpaper selection interface 1300, according to some examples. The wallpaper selection interface 1300 allows the first user ("John Smith") to select a wallpaper for electronic conversations with the second user ("Owen"). In order to present the wallpaper selection interface 1300, a change wallpaper tray 1302 appears and is displayed as overlaid over a user profile interface 1304 of the second user.

The change wallpaper tray 1302 has a "for us" tab 1306 and a camera roll tab 1308. User selection of the camera roll tab 1308 invokes a camera user interface and activates a camera of the first user device, allowing the first user to see a continuous camera feed and capture a new wallpaper using the camera. In FIG. 13, it is shown that the for us tab 1306 is selected.

The for us tab 1306 includes a plurality of default backgrounds 1310, presented in a grid. Instead of selecting one of the default backgrounds 1310 or capturing an image, the first user may select the prompt button 608 that is presented above the default backgrounds 1310. The prompt button 608 incorporates a tooltip in the example form of the following text: "GENERATE FROM ANY PROMPT." As mentioned above, this alerts the first user that the automated image generation feature is available.

FIG. 14 is a user interface diagram illustrating a prompt selection interface 1400, according to some examples. User selection of the prompt button 608 in FIG. 13 causes presentation, to the first user on the first user device, of the prompt selection interface 1400. In order to present the prompt selection interface 1400, the interaction system 100 causes a prompt selection tray 1402 to appear, overlaid on the user profile interface 1304.

The prompt selection tray 1402 includes an input text box 1404 where the user can enter the desired text prompt. Instead of entering a text prompt, the user may select the dice element 1406, as described above with reference to FIG. 7. As also described above, the prompt selection interface 1400 further includes a set of sample text prompts 1408.

Returning to FIG. 14, the user enters the following prompt in the input text box 1404: "Japanese Torii in a colorful mountain." After entering the prompt, the user selects the send button 1410, which causes the automated image generator 404 to generate the requested images and causes presentation of an image selection interface.

Components of the interaction system 100, e.g., the user management system 220 and the automated image generation system 234, receive, from the first user device of the first user, an image generation request and a conversation-specific wallpaper request associated with the image generation request. The conversation-specific wallpaper request includes an identifier of the second user to allow the user management system 220 to link the wallpaper, once generated and selected, to the two relevant user profiles (see FIG. 22, for example). The user management system 220 may obtain or detect the second identifier automatically, e.g., by detecting that the first user accessed the feature by selecting the wallpaper selection button in the user profile of the second user.

FIG. 15 is a user interface diagram illustrating an image selection interface, according to some examples. The image selection interface 1500 displays a plurality of candidate images 1502, generated by the automated image generator 404 based on the input text box 1404.

In some examples, a generative machine learning model, e.g., diffusion model, may be fed with the same input text prompt multiple times to generate multiple "versions," or "variations," of visual output, each based on the same text prompt. Alternatively, the model may be pre-configured to generate multiple outputs for each prompt. In FIG. 15, these candidate images 1502 may be seen as the model's prediction or interpretation of a suitable visual output corresponding to the text: "Japanese Torii in a colorful mountain."

The candidate images 1502 are arranged in a grid within the image selection interface 1500 (that is navigable through scrolling, as described above) to provide the first user with a convenient view of the options available for wallpaper selection. The first user can use the image selection interface 1500 to select one of these images as a chat wallpaper for chats between the first user and the second user, or submit a new prompt using the input text box 1506. Alternatively, the first user may dismiss the tray 1510, as mentioned above.

If the first user does decide to select one of the options, the first user can select (e.g., tap on) the desired option via the image selection interface 1500. In FIG. 15, the user selects the image 1504 and then selects the set wallpaper button 1508. In some examples, prior to finalizing the change, a preview interface may be displayed to allow the first user to preview the proposed new image.

Accordingly, user selection of the set wallpaper button 1508 may cause presentation of a wallpaper preview interface that includes the newly selected image 1504. FIG. 16 is a user interface diagram illustrating a wallpaper preview interface 1600, according to some examples. The wallpaper preview interface 1600 is displayed by automatically overlaying a preview tray 1612 on the user profile interface 1304.

The wallpaper preview interface 1600 allows the first user to view and experience an electronic conversation ("chat") via the interaction client 104 in which the image 1504 is presented as a chat wallpaper, in a preview state. In some examples, the wallpaper preview interface 1600 includes messages sent to the first user by an automated chat system of the interaction system 100 (identified as "Team Platform" in FIG. 16). In this way, the first user can receive and send messages, such as the received message 1602 and the sent message 1604, without having to commit to applying the image 1504 as a wallpaper in messaging exchanges with the second user.

The interaction system 100 further provides the first user with the option to modify the image 1504 prior to finalizing the image selection. Specifically, in FIG. 16, a blur wallpaper selector 1606 is included in the wallpaper preview interface 1600. If the user selects the blur wallpaper selector 1606, the image processing system 202 causes the image 1504 to be modified to apply a "blurry" effect. The user may then decide whether to retain the effect, or to cancel the effect and retain the original version of the image 1504 by deselecting the blur wallpaper selector 1606. It should be appreciated that a "blurry" effect is merely one example and user may be enabled to apply a variety of effects or modifications to the image generated by the automated image generator 404.

Once the first user has tested or previewed the image 1504 as required within the wallpaper preview interface 1600, the user can either cancel the selection of the image 1504 by selecting the cancel button 1608 in the wallpaper preview interface 1600, or confirm the selection by selecting the confirm button 1610.

In FIG. 16, for example, the confirm button 1610 is selected (as indicated by the highlighted border of the confirm button 1610), and the user management system 220 causes the image 1504 to be selected and to become associated with the first user profile of the first user and the second user profile of the second user. The profile data 302 of one or both users (or the entity table 308) may be updated to store the image, or a link to the image, as a conversation-specific wallpaper in association with the profiles.

FIG. 17 is a user interface diagram illustrating an interaction interface 1700, according to some examples. The interaction interface 1700 enables electronic conversations between the first user and the second user within the interaction system 100. More specifically, the interaction interface 1700 of FIG. 17 is presented to the first user ("John Smith") to allow the first user to exchange messages with the second user ("Owen") within the interaction system 100, and using the interaction client 104. A contact identifier 1702 identifies that the interaction interface 1700 is to be used for a conversation with the second user ("Owen").

The interaction interface 1700 displays the image 1504 as a chat wallpaper, or background. Further, the interaction interface 1700 displays a notification 1704 serving as confirmation to the first user that they have changed the wallpaper. The second user may receive a similar notification when opening the interaction interface 1700 on the second user device, e.g., "John Smith changed the wallpaper."

Accordingly, examples of the present disclosure enable a first user to obtain an automatically generated image, e.g., a wallpaper, and a second user to be presented with the image, e.g., by causing presentation of a conversation-specific wallpaper in an interaction interface that is generated at the first user device and at the second user device.

Using example techniques such as those described with reference to FIG. 6 to FIG. 17, a number of manual steps or selections may be eliminated. For example, users may be able to obtain and link an AI-generated images to user profiles without having to access any external application, media library, or the like. The use of the automated image generation system 234 to generate background images and chat wallpapers are non-limiting examples of use cases. In some examples, the user is enabled to use the automated image generation system 234 to generate other types of images, e.g., an updated image to select as the user's avatar 1102 within the interaction system 100.

FIG. 18 to FIG. 21 provide a third set of user interface diagrams, illustrating the use of a text-guided, automatically generated image in an augmentation function provided by the interaction system 100.

Figures 18, 19:
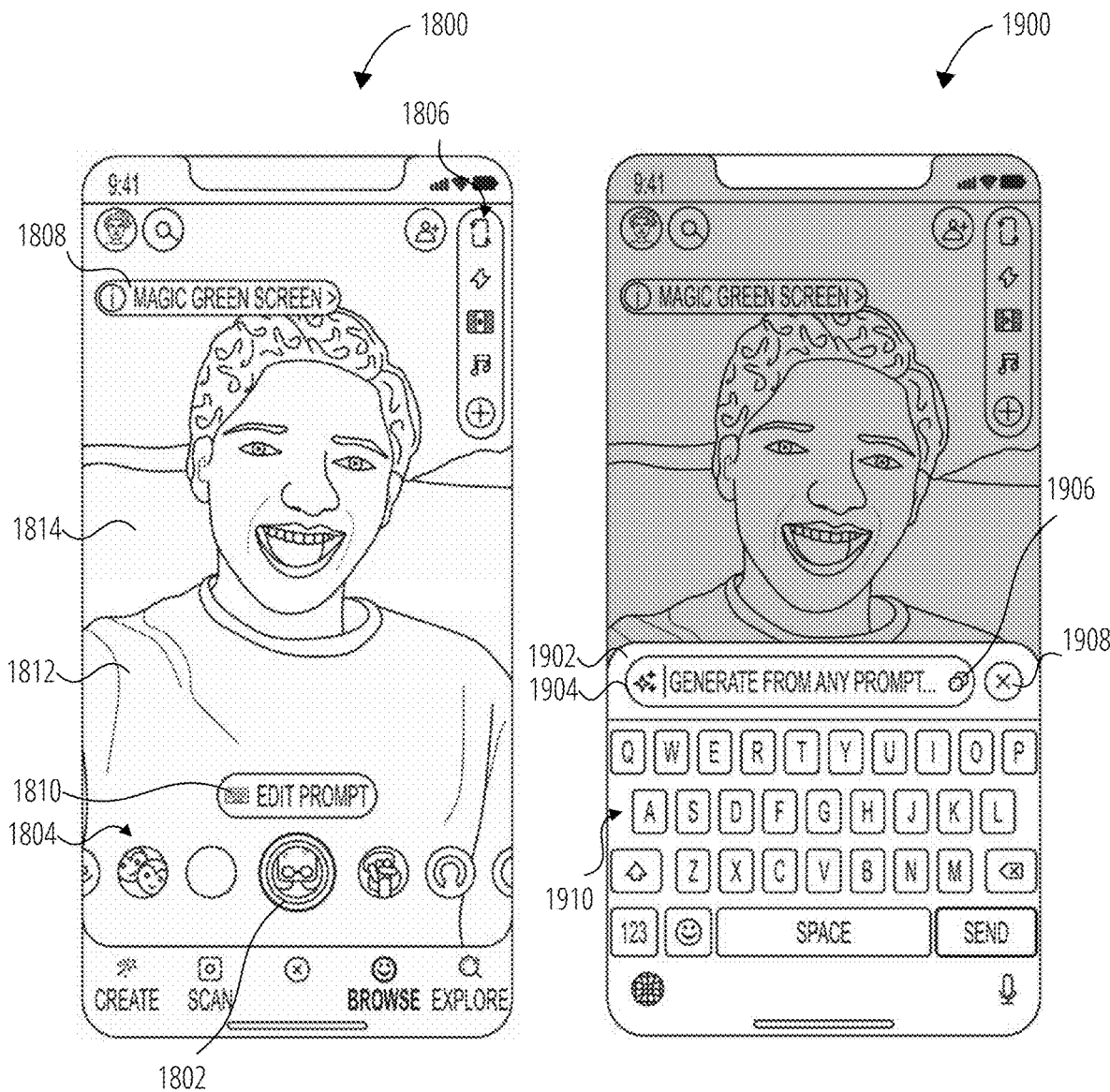
FIG. 18 is a user interface diagram illustrating a content generation interface, according to some examples.
FIG. 19 is a user interface diagram illustrating a prompt selection tray overlaid onto a content generation interface, according to some examples.

FIG. 18 is a user interface diagram illustrating a content generation interface 1800, according to some examples. The content generation interface 1800 presents a continuous image feed from one or more cameras of a user device of a first user, e.g., the mobile device 114 or another user system 102. In FIG. 18, a first user uses the camera to capture a foreground image area 1812 (being a self-portrait image of the first user, or "selfie") and the camera also captures a background image area 1814 that includes the landscape behind the first user.

The content generation interface 1800 provides a capture button 1802 for capturing content displayed within the content generation interface 1800. The content generation interface 1800 also provides various user interface elements, such as user-selectable buttons and controls, some of which are described below. It will be appreciated that the buttons and controls are not captured when a user selects the capture button 1802, e.g., the interaction system 100 only causes capturing of the camera feed and, if applicable, one or more augmentations or additional content selected by the user to be added to the content captured by the camera.

The content generation interface 1800 includes an interaction zone with a function or tools section, in the example form of a function carousel 1806. The function carousel 1806 presents various tools and functions that may be invoked by a user using the interaction client 104 to create and modify content.

The content generation interface 1800 further displays an augmentation carousel 1804 that allows the user to select from multiple available content augmentations (also referred to as "lenses," "filters," or "effects"). In FIG. 18, an automatic background generator augmentation, referred to as "Magic Green Screen," is selected. The augmentation that has been selected is identified by an augmentation identifier 1808, and also by display of an icon for that augmentation within the capture button 1802. The capture button 1802 is located centrally and shown as enlarged relative to other augmentation icons in the augmentation carousel 1804.

The capture button 1802 is user-selectable to capture image content (a still image or video content). If an augmentation is applied within the content generation interface 1800, that augmentation will then also be captured or applied within the image content to create an augmented media content item. The user can change the selected augmentation by scrolling the augmentation carousel 1804 to the left or to the right, thereby to cause another augmentation to be moved into the capture button 1802 position.

Turning now specifically to the automatic background generator augmentation ("Magic Green Screen"), when this augmentation is selected within the augmentation carousel 1804, an edit prompt button 1810 is presented above the capture button 1802, as shown in FIG. 18. The user can select the edit prompt button 1810 to invoke the automatic image generation function of the interaction system 100. In this way, a user can generate a unique or creative image inside of the content generation interface 1800 using generative AI technology, and apply that image as part of an augmentation function.

FIG. 19 is a user interface diagram illustrating a prompt selection tray 1902 overlaid on a content generation interface 1900, according to some examples. User selection of the edit prompt button 1810 shown in FIG. 18 causes the prompt selection tray 1902 to be displayed as overlaid on the content generation interface 1900.

The prompt selection tray 1902 includes an input text box 1904 where the user can enter the desired text prompt (e.g., using a keyboard 1910 that is presented as part of the prompt selection tray 1902). Instead of manually entering a text prompt, the user may select the dice element 1906 that is displayed within the input text box 1904. As mentioned above, an automatic prompt generation element in the example form of a dice element 1906 is user-selectable to cause automatic generation of a candidate text prompt within the input text box 1904. If the user wishes to cancel the image generation request, the user can select a cancel button 1908 displayed adjacent to the dice element 1906 to return to the content generation interface 1800.

Figure 20:
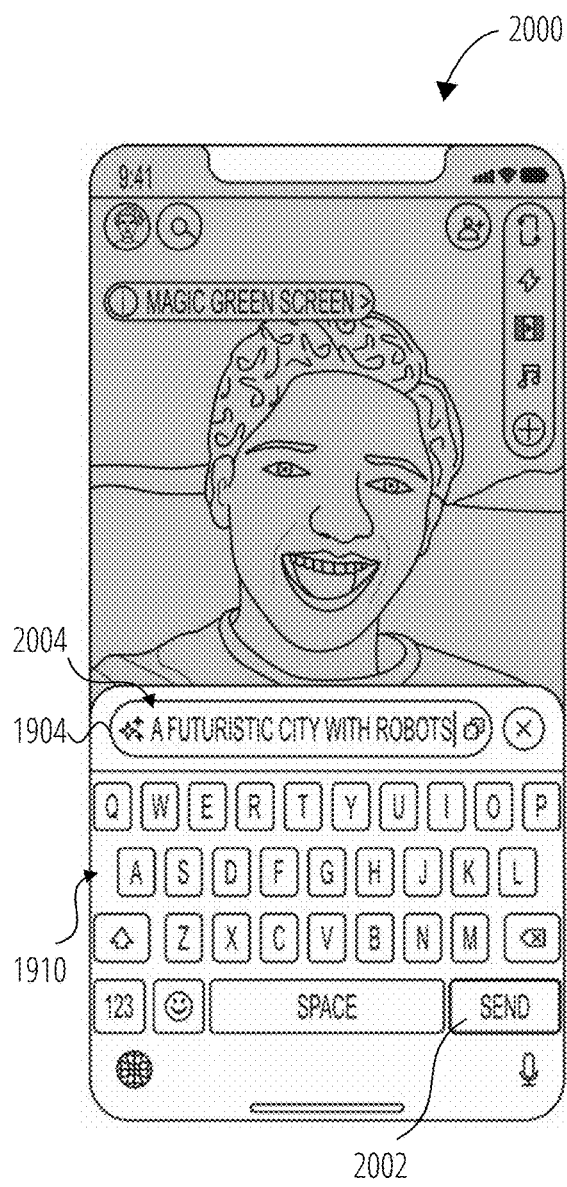
FIG. 20 is a user interface diagram illustrating a prompt selection tray overlaid onto a content generation interface, according to some examples.

FIG. 20 is a user interface diagram illustrating a prompt selection tray overlaid on a content generation interface 2000, according to some examples. The user enters the following text prompt 2004 using the keyboard 1910: "A futuristic city with robots." The user then selects a send button 2002 of the keyboard 1910.

In some examples, after the first user has selected the send button 2002, the image processing system 202 may receive, from the first user device of the first user, a content item augmentation request. An image generation request may be transmitted to the automated image generation system 234 in order to generate an image corresponding to the text prompt. The user may be presented with a loading state interface, e.g., a loading spinner as described with reference to FIG. 9, if required, while the interaction system 100 generates the requested image or while the image is being downloaded at the user's device.

Figure 21:
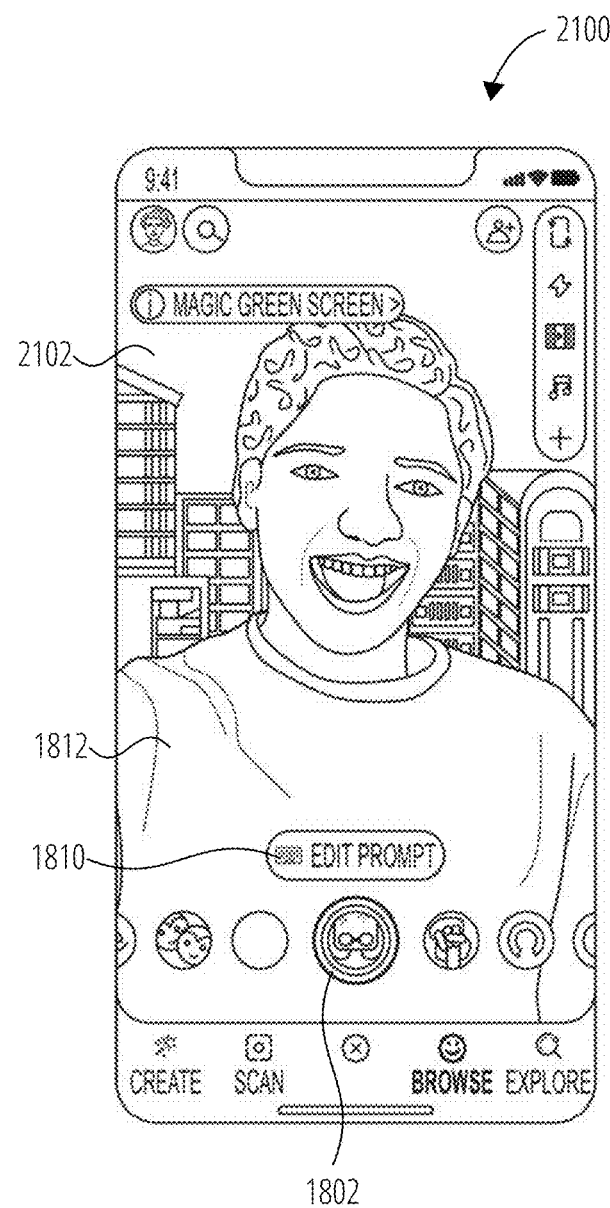
FIG. 21 is a user interface diagram illustrating a content generation interface, including an automatically generated image presented as a background of a media content item.

FIG. 21 is a user interface diagram illustrating a content generation interface 2100, including an automatically generated image 2102 presented as a background image, according to some examples.

The image processing system 202 receives the automatically generated image 2102 from the automated image generation system 234 and processes the image together with the feed captured from the user's camera in order to enable presentation of the generated image as a background image (to apply the effect). For example, and as shown in FIG. 21, the image processing system 202 automatically separates the foreground image area 1812 from the background image area 1814 and replaces the background image area 1814 with the corresponding parts of the automatically generated image 2102. In this way, the automatically generated image 2102 may be applied as an augmentation to a media content item captured, generated, or selected by the first user.

To apply this augmentation, a segmentation mask may be generated, and the automatically generated image 2102 may be applied to the media content item based on the generated segmentation mask. For example, the image processing system 202 may use a segmentation mask to separate the foreground image area 1812 from the background image area 1814. This mask may comprise a binary image that identifies which pixels belong to the foreground and which belong to the background. Based on the mask, the background image area 1814 may then automatically be replaced with the automatically generated image 2102.

Once the augmentation has been applied, the first user may select the capture button 1802 to cause generation of a media content item, e.g., a still image including the "selfie" and the automatically generated background, or a video of the first user with the automatically generated background shown behind the first user. The media content item may be shared with a second user, e.g., via a direct message within the interaction system 100, or via an off-platform message, or may be shared with a plurality of users by posting or publishing the media content item. In this way, a second user, or a plurality of other users, is enabled to access the media content item that includes the augmentation. The media content item including the AI-generated image is automatically associated with the first user, e.g., by automatically storing it in association with the first user, by linking it to the user's profile to make it available for future use, by publishing it in association with a user profile of the first user, or the like.

Machine Learning Program

Figure 23:
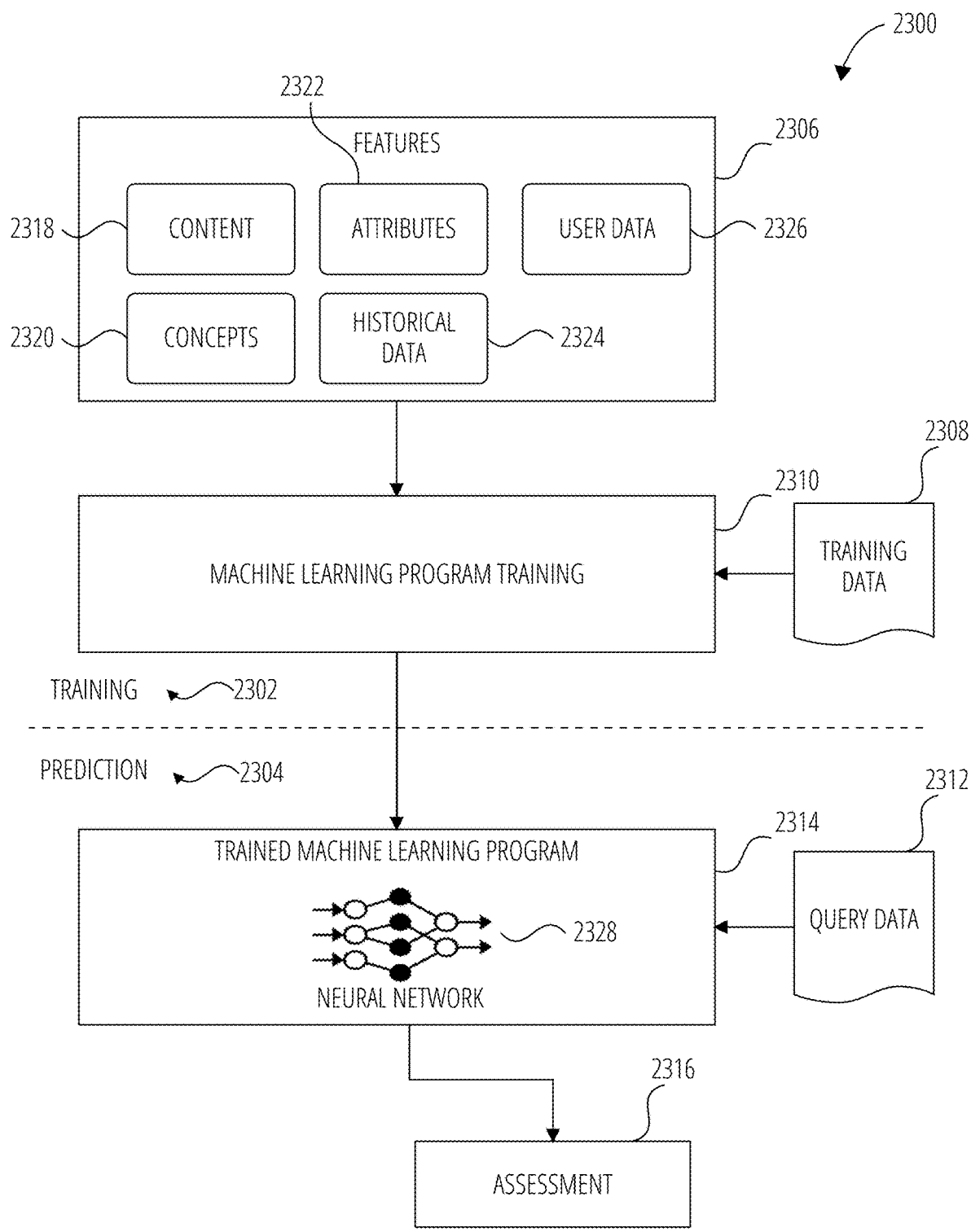
FIG. 23 is a diagrammatic illustration of training and use of a machine learning program, according to some examples.

FIG. 23 is a block diagram showing a machine learning program 2300, according to some examples. The machine learning programs 2300, also referred to as machine learning algorithms or tools, are used as part of the systems described herein to perform operations associated with searches and query responses.

Machine learning is a field of study that gives computers the ability to learn without being explicitly programmed. Machine learning explores the study and construction of algorithms, also referred to herein as tools, that may learn from or be trained using existing data and make predictions about or based on new data. Such machine learning tools operate by building a model from example training data 2308 in order to make data-driven predictions or decisions expressed as outputs or assessments (e.g., assessment 2316). Although examples are presented with respect to a few machine learning tools, the principles presented herein may be applied to other machine learning tools.

In some examples, different machine learning tools may be used. For example, Logistic Regression (LR), Naive-Bayes, Random Forest (RF), neural networks (NN), matrix factorization, and Support Vector Machines (SVM) tools may be used.

Two common types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number).

The machine learning program 2300 supports two types of phases, namely training phases 2302 and prediction phases 2304. In training phases 2302, supervised learning, unsupervised or reinforcement learning may be used. For example, the machine learning program 2300 (1) receives features 2306 (e.g., as structured or labeled data in supervised learning) and/or (2) identifies features 2306 (e.g., unstructured or unlabeled data for unsupervised learning) in training data 2308. In prediction phases 2304, the machine learning program 2300 uses the features 2306 for analyzing query data 2312 to generate outcomes or predictions, as examples of an assessment 2316.

In the training phase 2302, feature engineering is used to identify features 2306 and may include identifying informative, discriminating, and independent features for the effective operation of the machine learning program 2300 in pattern recognition, classification, and regression. In some examples, the training data 2308 includes labeled data, which is known data for pre-identified features 2306 and one or more outcomes. Each of the features 2306 may be a variable or attribute, such as individual measurable property of a process, article, system, or phenomenon represented by a data set (e.g., the training data 2308). Features 2306 may also be of different types, such as numeric features, strings, and graphs, and may include one or more of content 2318, concepts 2320, attributes 2322, historical data 2324 and/or user data 2326, merely for example.

The concept of a feature in this context is related to that of an explanatory variable used in statistical techniques such as linear regression. Choosing informative, discriminating, and independent features is important for the effective operation of the machine learning program 2300 in pattern recognition, classification, and regression. Features may be of different types, such as numeric features, strings, and graphs.

In training phases 2302, the machine learning program 2300 uses the training data 2308 to find correlations among the features 2306 that affect a predicted outcome or assessment 2316.

With the training data 2308 and the identified features 2306, the machine learning program 2300 is trained during the training phase 2302 at machine learning program training 2310. The machine learning program 2300 appraises values of the features 2306 as they correlate to the training data 2308. The result of the training is the trained machine learning program 2314 (e.g., a trained or learned model).

Further, the training phases 2302 may involve machine learning, in which the training data 2308 is structured (e.g., labeled during preprocessing operations), and the trained machine learning program 2314 implements a relatively simple neural network 2328 capable of performing, for example, classification and clustering operations. In other examples, the training phase 2302 may involve deep learning, in which the training data 2308 is unstructured, and the trained machine learning program 2314 implements a deep neural network 2328 that is able to perform both feature extraction and classification/clustering operations.

A neural network 2328 generated during the training phase 2302, and implemented within the trained machine learning program 2314, may include a hierarchical (e.g., layered) organization of neurons. For example, neurons (or nodes) may be arranged hierarchically into a number of layers, including an input layer, an output layer, and multiple hidden layers. Each of the layers within the neural network 2328 can have one or many neurons and each of these neurons operationally computes a small function (e.g., activation function). For example, if an activation function generates a result that transgresses a particular threshold, an output may be communicated from that neuron (e.g., transmitting neuron) to a connected neuron (e.g., receiving neuron) in successive layers. Connections between neurons also have associated weights, which defines the influence of the input from a transmitting neuron to a receiving neuron.

In some examples, the neural network 2328 may also be one of a number of different types of neural networks, including a single-layer feed-forward network, an Artificial Neural Network (ANN), a Recurrent Neural Network (RNN), a symmetrically connected neural network, and unsupervised pre-trained network, a Convolutional Neural Network (CNN), a Recursive Neural Network (RNN), a VAE, a GAN, or an autoregressive model, merely for example.

During prediction phases 2304, the trained machine learning program 2314 is used to perform an assessment. Query data 2312 is provided as an input to the trained machine learning program 2314, and the trained machine learning program 2314 generates the assessment 2316 as output, responsive to receipt of the query data 2312.

In some examples, a trained machine learning program 2314 can be used for automated image generation as described in the present disclosure. Automated image generation, and specifically text-guided AI-driven image generation, can be achieved using different types of machine learning programs (or models). As mentioned elsewhere, examples of these include VAEs, GANs, autoregressive models, and diffusion models.

A VAE is an unsupervised machine learning program that generates an image by processing a text prompt and mapping it to a latent space representation. The latest space representation may then be used to generate an image that corresponds to the text prompt. VAEs are designed to learn the distribution of a dataset and apply that to generate new images likely to conform more closely to the dataset.

A GAN is a generative model that comprises a generator and a discriminator. The generator may generate images based on text prompts, and the discriminator may evaluate the generated images for realism and/or other metrics, depending on the implementation. The generator and discriminator are trained simultaneously to generate images aimed at closely matching the input text prompt. The generator generates an image that is intended to deceive the discriminator into designating the image as "real," while the discriminator generates an image to evaluate the realism of the generator's output. In this way, both networks can be optimized towards their objectives and improve the quality of the generated images.

Autoregressive models generate images pixel by pixel, where each pixel is generated based on the previous pixels. Autoregressive models may be trained, for example, using maximum likelihood estimation (MLE) to learn the conditional probability distribution of each pixel in an image given its previous pixels.

Diffusion models, as described in greater detail above, are generative models that generate images by diffusing noise over time. The program may take in a text prompt and generate a noise vector, which is then diffused over a set number of time steps to generate an image.

In some examples, a diffusion-based model may also take an image as an input to produce a generated image that is conditioned on the input image and the relevant text. In this way, an AI-generated image can be seeded with an initial image such as a drawing or photograph, with the model being instructed to build or generate a new image on top of, or conditioned on, the input image, e.g., to preserve a general shape or layout of the input image. While a text-to-image diffusion technique that does not utilize an input image may commence the diffusion process with pure noise and progressively refine the generated image, using an input image may allow for some earlier steps to be skipped, e.g., by commencing with the input image mixed with Gaussian noise.

Data Communications Architecture

Figure 24:
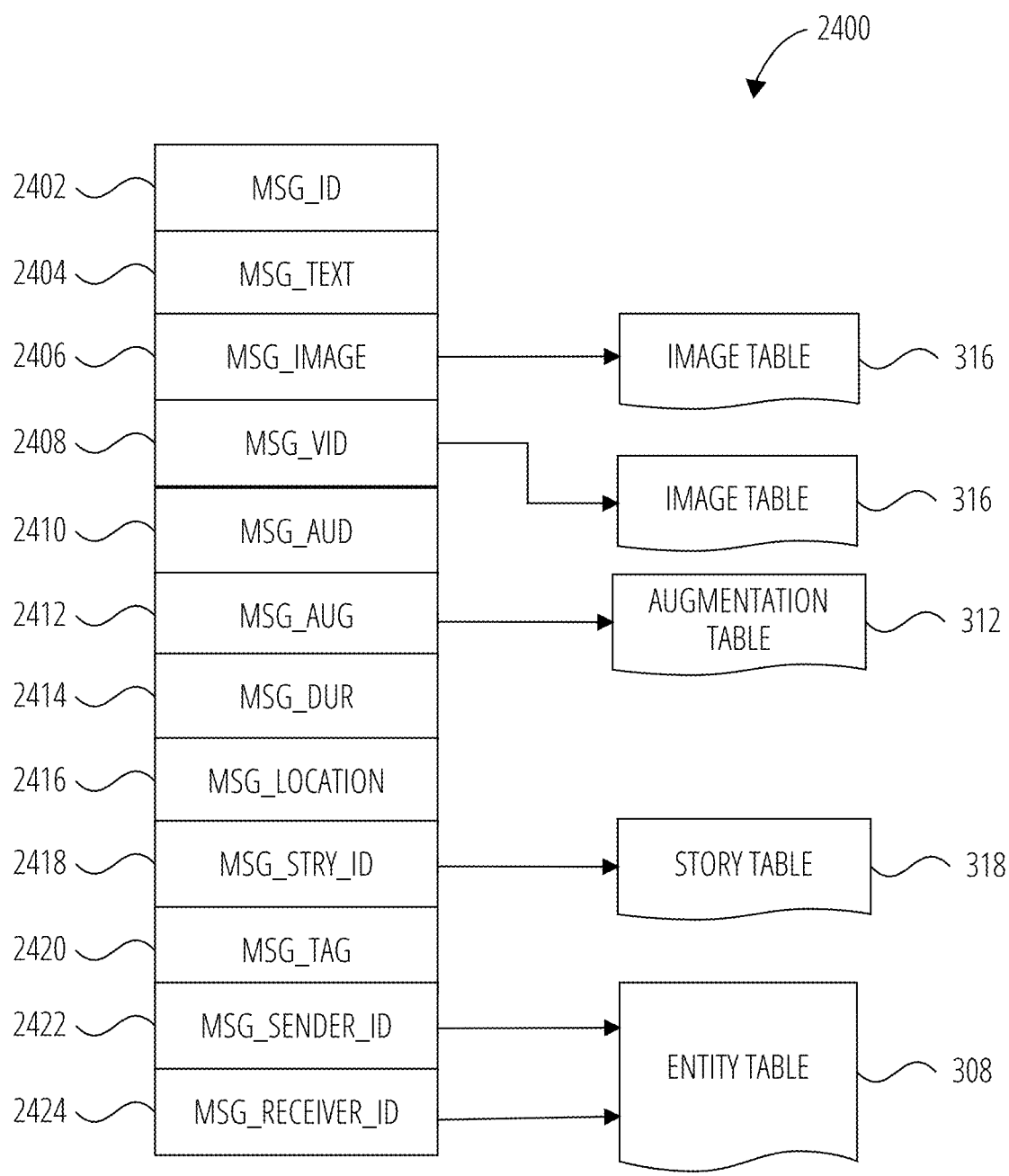
FIG. 24 is a diagrammatic representation of a message, according to some examples.

FIG. 24 is a schematic diagram illustrating a structure of a message 2400, according to some examples, generated by an interaction client 104 for communication to a further interaction client 104 via the interaction servers 124. The content of a particular message 2400 is used to populate the message table 306 stored within the database 304, accessible by the interaction servers 124. Similarly, the content of a message 2400 is stored in memory as "in-transit" or "in-flight" data of the user system 102 or the interaction servers 124. A message 2400 is shown to include the following example components:

Message identifier 2402: a unique identifier that identifies the message 2400.

Message text payload 2404: text, to be generated by a user via a user interface of the user system 102, and that is included in the message 2400.

Message image payload 2406: image data, captured by a camera component of a user system 102 or retrieved from a memory component of a user system 102, and that is included in the message 2400. Image data for a sent or received message 2400 may be stored in the image table 316.

Message video payload 2408: video data, captured by a camera component or retrieved from a memory component of the user system 102, and that is included in the message 2400. Video data for a sent or received message 2400 may be stored in the image table 316.

Message audio payload 2410: audio data, captured by a microphone or retrieved from a memory component of the user system 102, and that is included in the message 2400.

Message augmentation data 2412: augmentation data (e.g., filters, stickers, or other annotations or enhancements) that represents augmentations to be applied to message image payload 2406, message video payload 2408, or message audio payload 2410 of the message 2400. Augmentation data for a sent or received message 2400 may be stored in the augmentation table 312.

Message duration parameter 2414: parameter value indicating, in seconds, the amount of time for which content of the message (e.g., the message image payload 2406, message video payload 2408, message audio payload 2410) is to be presented or made accessible to a user via the interaction client 104.

Message geolocation parameter 2416: geolocation data (e.g., latitudinal and longitudinal coordinates) associated with the content payload of the message. Multiple message geolocation parameter 2416 values may be included in the payload, each of these parameter values being associated with respect to content items included in the content (e.g., a specific image within the message image payload 2406, or a specific video in the message video payload 2408).

Message story identifier 2418: identifier values identifying one or more content collections (e.g., "stories" identified in the story table 318) with which a particular content item in the message image payload 2406 of the message 2400 is associated. For example, multiple images within the message image payload 2406 may each be associated with multiple content collections using identifier values.

Message tag 2420: each message 2400 may be tagged with multiple tags, each of which is indicative of the subject matter of content included in the message payload. For example, where a particular image included in the message image payload 2406 depicts an animal (e.g., a lion), a tag value may be included within the message tag 2420 that is indicative of the relevant animal. Tag values may be generated manually, based on user input, or may be automatically generated using, for example, image recognition.

Message sender identifier 2422: an identifier (e.g., a messaging system identifier, email address, or device identifier) indicative of a user of the user system 102 on which the message 2400 was generated and from which the message 2400 was sent.

Message receiver identifier 2424: an identifier (e.g., a messaging system identifier, email address, or device identifier) indicative of a user of the user system 102 to which the message 2400 is addressed.

The contents (e.g., values) of the various components of message 2400 may be pointers to locations in tables within which content data values are stored. For example, an image value in the message image payload 2406 may be a pointer to (or address of) a location within an image table 316. Similarly, values within the message video payload 2408 may point to data stored within an image table 316, values stored within the message augmentation data 2412 may point to data stored in an augmentation table 312, values stored within the message story identifier 2418 may point to data stored in a story table 318, and values stored within the message sender identifier 2422 and the message receiver identifier 2424 may point to user records stored within an entity table 308.

System with Head-Wearable Apparatus

Figure 25:
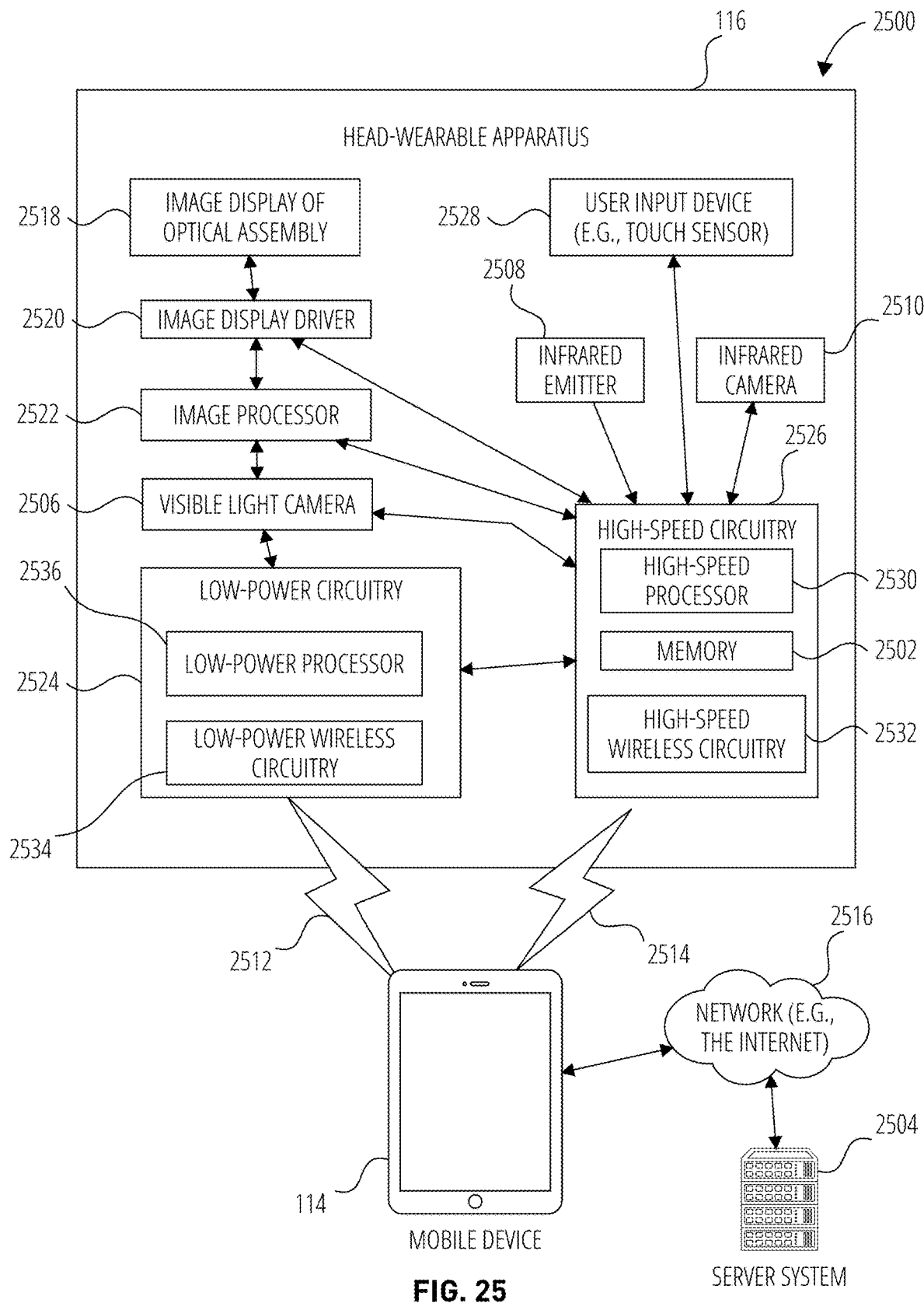
FIG. 25 is a diagrammatic representation of a system including a head-wearable apparatus, according to some examples.

FIG. 25 illustrates a system 2500 including a head-wearable apparatus 116 with a selector input device, according to some examples. FIG. 25 is a high-level functional block diagram of an example head-wearable apparatus 116 communicatively coupled to a mobile device 114 and various server systems 2504 (e.g., the interaction server system 110) via various networks 108.

The head-wearable apparatus 116 includes one or more cameras, each of which may be, for example, a visible light camera 2506, an infrared emitter 2508, and an infrared camera 2510.

The mobile device 114 connects with head-wearable apparatus 116 using both a low-power wireless connection 2512 and a high-speed wireless connection 2514. The mobile device 114 is also connected to the server system 2504 and the network 2516.

The head-wearable apparatus 116 further includes two image displays of the image display of optical assembly 2518. The two image displays of optical assembly 2518 include one associated with the left lateral side and one associated with the right lateral side of the head-wearable apparatus 116. The head-wearable apparatus 116 also includes an image display driver 2520, an image processor 2522, low-power circuitry 2524, and high-speed circuitry 2526. The image display of optical assembly 2518 is for presenting images and videos, including an image that can include a graphical user interface to a user of the head-wearable apparatus 116.

The image display driver 2520 commands and controls the image display of optical assembly 2518. The image display driver 2520 may deliver image data directly to the image display of optical assembly 2518 for presentation or may convert the image data into a signal or data format suitable for delivery to the image display device. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (EXIF) or the like.

The head-wearable apparatus 116 includes a frame and stems (or temples) extending from a lateral side of the frame. The head-wearable apparatus 116 further includes a user input device 2528 (e.g., touch sensor or push button), including an input surface on the head-wearable apparatus 116. The user input device 2528 (e.g., touch sensor or push button) is to receive from the user an input selection to manipulate the graphical user interface of the presented image.

The components shown in FIG. 25 for the head-wearable apparatus 116 are located on one or more circuit boards, for example a PCB or flexible PCB, in the rims or temples. Alternatively, or additionally, the depicted components can be located in the chunks, frames, hinges, or bridge of the head-wearable apparatus 116. Left and right visible light cameras 2506 can include digital camera elements such as a complementary metal oxide-semiconductor (CMOS) image sensor, charge-coupled device, camera lenses, or any other respective visible or light-capturing elements that may be used to capture data, including images of scenes with unknown objects.

The head-wearable apparatus 116 includes a memory 2502, which stores instructions to perform a subset or all of the functions described herein. The memory 2502 can also include a storage device.

As shown in FIG. 25, the high-speed circuitry 2526 includes a high-speed processor 2530, a memory 2502, and high-speed wireless circuitry 2532. In some examples, the image display driver 2520 is coupled to the high-speed circuitry 2526 and operated by the high-speed processor 2530 in order to drive the left and right image displays of the image display of optical assembly 2518. The high-speed processor 2530 may be any processor capable of managing high-speed communications and operation of any general computing system needed for the head-wearable apparatus 116. The high-speed processor 2530 includes processing resources needed for managing high-speed data transfers on a high-speed wireless connection 2514 to a wireless local area network (WLAN) using the high-speed wireless circuitry 2532. In certain examples, the high-speed processor 2530 executes an operating system such as a LINUX operating system or other such operating system of the head-wearable apparatus 116, and the operating system is stored in the memory 2502 for execution. In addition to any other responsibilities, the high-speed processor 2530 executing a software architecture for the head-wearable apparatus 116 is used to manage data transfers with high-speed wireless circuitry 2532. In certain examples, the high-speed wireless circuitry 2532 is configured to implement Institute of Electrical and Electronic Engineers (IEEE) 802.11 communication standards, also referred to herein as WiFi. In some examples, other high-speed communications standards may be implemented by the high-speed wireless circuitry 2532.

The low-power wireless circuitry 2534 and the high-speed wireless circuitry 2532 of the head-wearable apparatus 116 can include short-range transceivers (Bluetooth™) and wireless wide, local, or wide area network transceivers (e.g., cellular or WiFi). Mobile device 114, including the transceivers communicating via the low-power wireless connection 2512 and the high-speed wireless connection 2514, may be implemented using details of the architecture of the head-wearable apparatus 116, as can other elements of the network 2516.

The memory 2502 includes any storage device capable of storing various data and applications, including, among other things, camera data generated by the left and right visible light cameras 2506, the infrared camera 2510, and the image processor 2522, as well as images generated for display by the image display driver 2520 on the image displays of the image display of optical assembly 2518. While the memory 2502 is shown as integrated with high-speed circuitry 2526, in some examples, the memory 2502 may be an independent standalone element of the head-wearable apparatus 116. In certain such examples, electrical routing lines may provide a connection through a chip that includes the high-speed processor 2530 from the image processor 2522 or the low-power processor 2536 to the memory 2502. In some examples, the high-speed processor 2530 may manage addressing of the memory 2502 such that the low-power processor 2536 will boot the high-speed processor 2530 any time that a read or write operation involving memory 2502 is needed.

As shown in FIG. 25, the low-power processor 2536 or high-speed processor 2530 of the head-wearable apparatus 116 can be coupled to the camera (visible light camera 2506, infrared emitter 2508, or infrared camera 2510), the image display driver 2520, the user input device 2528 (e.g., touch sensor or push button), and the memory 2502.

The head-wearable apparatus 116 is connected to a host computer. For example, the head-wearable apparatus 116 is paired with the mobile device 114 via the high-speed wireless connection 2514 or connected to the server system 2504 via the network 2516. The server system 2504 may be one or more computing devices as part of a service or network computing system, for example, that includes a processor, a memory, and network communication interface to communicate over the network 2516 with the mobile device 114 and the head-wearable apparatus 116.

The mobile device 114 includes a processor and a network communication interface coupled to the processor. The network communication interface allows for communication over the network 2516, low-power wireless connection 2512, or high-speed wireless connection 2514. Mobile device 114 can further store at least portions of the instructions for generating binaural audio content in the mobile device 114's memory to implement the functionality described herein.

Output components of the head-wearable apparatus 116 include visual components, such as a display such as a liquid crystal display (LCD), a plasma display panel (PDP), a light-emitting diode (LED) display, a projector, or a waveguide. The image displays of the optical assembly are driven by the image display driver 2520. The output components of the head-wearable apparatus 116 further include acoustic components (e.g., speakers), haptic components (e.g., a vibratory motor), other signal generators, and so forth. The input components of the head-wearable apparatus 116, the mobile device 114, and server system 2504, such as the user input device 2528, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 116 may also include additional peripheral device elements. Such peripheral device elements may include biometric sensors, additional sensors, or display elements integrated with the head-wearable apparatus 116. For example, peripheral device elements may include any I/O components including output components, motion components, position components, or any other such elements described herein.

For example, the biometric components include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 2512 and high-speed wireless connection 2514 from the mobile device 114 via the low-power wireless circuitry 2534 or high-speed wireless circuitry 2532.

Machine Architecture

Figure 26:
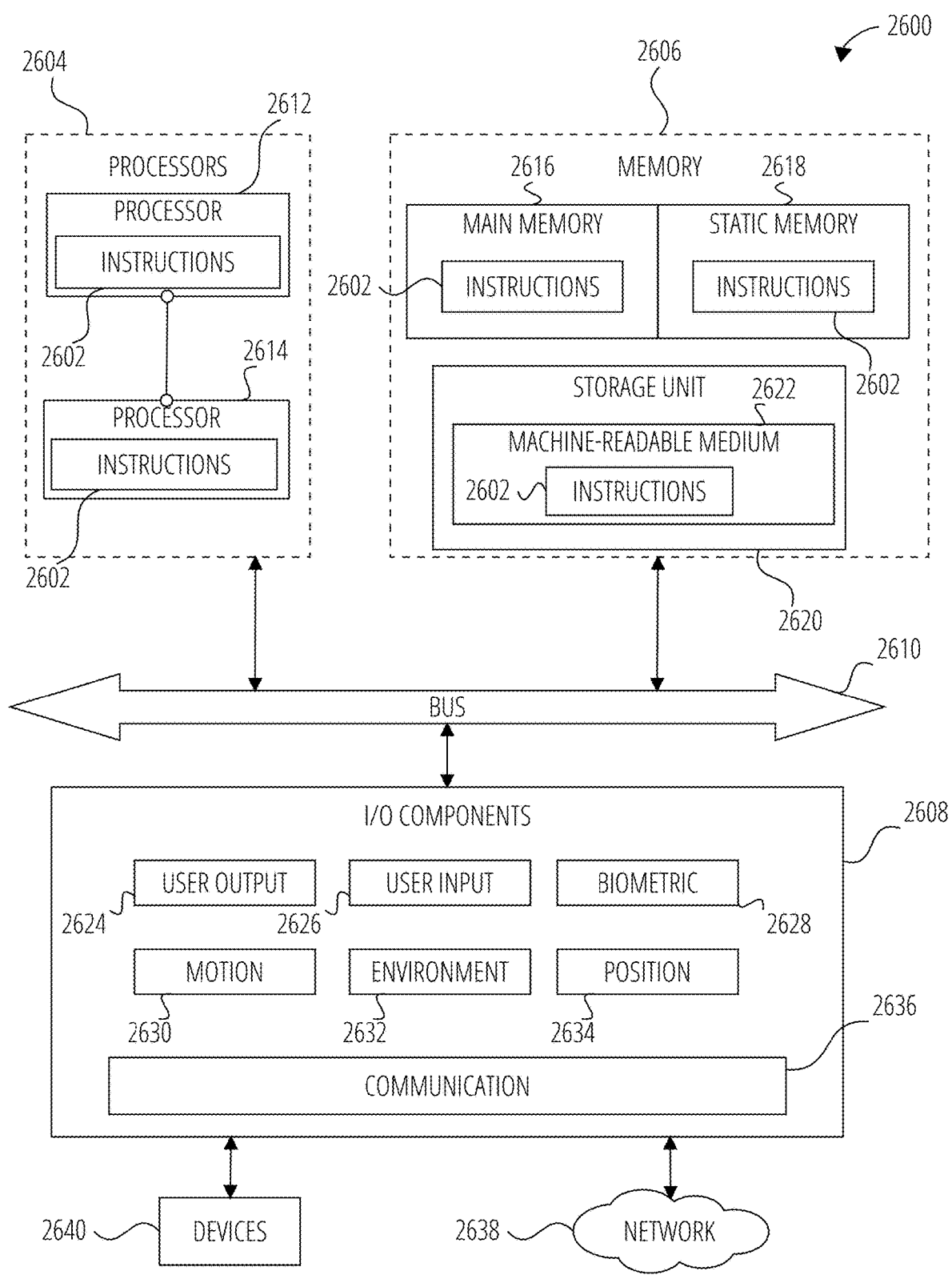
FIG. 26 is a diagrammatic representation of a machine in the form of a computer system within which a set of instructions may be executed to cause the machine to perform any one or more of the methodologies discussed herein, according to some examples.

FIG. 26 is a diagrammatic representation of the machine 2600 within which instructions 2602 (e.g., software, a program, an application, an applet, an app, or other executable code) for causing the machine 2600 to perform any one or more of the methodologies discussed herein may be executed. For example, the instructions 2602 may cause the machine 2600 to execute any one or more of the methods described herein. The instructions 2602 transform the general, non-programmed machine 2600 into a particular machine 2600 programmed to carry out the described and illustrated functions in the manner described. The machine 2600 may operate as a standalone device or may be coupled (e.g., networked) to other machines. In a networked deployment, the machine 2600 may operate in the capacity of a server machine or a client machine in a server-client network environment, or as a peer machine in a peer-to-peer (or distributed) network environment. The machine 2600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 2602, sequentially or otherwise, that specify actions to be taken by the machine 2600. Further, while a single machine 2600 is illustrated, the term "machine" shall also be taken to include a collection of machines that individually or jointly execute the instructions 2602 to perform any one or more of the methodologies discussed herein. The machine 2600, for example, may comprise the user system 102 or any one of multiple server devices forming part of the interaction server system 110. In some examples, the machine 2600 may also comprise both client and server systems, with certain operations of a particular method or algorithm being performed on the server-side and with certain operations of the particular method or algorithm being performed on the client-side.

The machine 2600 may include processors 2604, memory 2606, and input/output I/O components 2608, which may be configured to communicate with each other via a bus 2610. In an example, the processors 2604 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 2612 and a processor 2614 that execute the instructions 2602. The term "processor" is intended to include multi-core processors that may comprise two or more independent processors (sometimes referred to as "cores") that may execute instructions contemporaneously. Although FIG. 26 shows multiple processors 2604, the machine 2600 may include a single processor with a single-core, a single processor with multiple cores (e.g., a multi-core processor), multiple processors with a single core, multiple processors with multiples cores, or any combination thereof.

The memory 2606 includes a main memory 2616, a static memory 2618, and a storage unit 2620, both accessible to the processors 2604 via the bus 2610. The main memory 2606, the static memory 2618, and storage unit 2620 store the instructions 2602 embodying any one or more of the methodologies or functions described herein. The instructions 2602 may also reside, completely or partially, within the main memory 2616, within the static memory 2618, within machine-readable medium 2622 within the storage unit 2620, within at least one of the processors 2604 (e.g., within the processor's cache memory), or any suitable combination thereof, during execution thereof by the machine 2600.

The I/O components 2608 may include a wide variety of components to receive input, provide output, produce output, transmit information, exchange information, capture measurements, and so on. The specific I/O components 2608 that are included in a particular machine will depend on the type of machine. For example, portable machines such as mobile phones may include a touch input device or other such input mechanisms, while a headless server machine will likely not include such a touch input device. It will be appreciated that the I/O components 2608 may include many other components that are not shown in FIG. 26. In various examples, the I/O components 2608 may include user output components 2624 and user input components 2626. The user output components 2624 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 2626 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 2608 may include biometric components 2628, motion components 2630, environmental components 2632, or position components 2634, among a wide array of other components. For example, the biometric components 2628 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 2630 include acceleration sensor components (e.g., accelerometer), gravitation sensor components, rotation sensor components (e.g., gyroscope).

The environmental components 2632 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 102 may also include a 3600 camera for capturing 360° photographs and videos.

Further, the camera system of the user system 102 may include dual rear cameras (e.g., a primary camera as well as a depth-sensing camera), or even triple, quad or penta rear camera configurations on the front and rear sides of the user system 102. These multiple camera systems may include a wide camera, an ultra-wide camera, a telephoto camera, a macro camera, and a depth sensor, for example.

The position components 2634 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 2608 further include communication components 2636 operable to couple the machine 2600 to a network 2638 or devices 2640 via respective coupling or connections. For example, the communication components 2636 may include a network interface component or another suitable device to interface with the network 2638. In further examples, the communication components 2636 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 2640 may be another machine or any of a wide variety of peripheral devices (e.g., a peripheral device coupled via a USB).

Moreover, the communication components 2636 may detect identifiers or include components operable to detect identifiers. For example, the communication components 2636 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 2636, such as location via Internet Protocol (IP) geolocation, location via Wi-Fi® signal triangulation, location via detecting an NFC beacon signal that may indicate a particular location, and so forth.

The various memories (e.g., main memory 2616, static memory 2618, and memory of the processors 2604) and storage unit 2620 may store one or more sets of instructions and data structures (e.g., software) embodying or used by any one or more of the methodologies or functions described herein. These instructions (e.g., the instructions 2602), when executed by processors 2604, cause various operations to implement the disclosed examples.

The instructions 2602 may be transmitted or received over the network 2638, using a transmission medium, via a network interface device (e.g., a network interface component included in the communication components 2636) and using any one of several well-known transfer protocols (e.g., hypertext transfer protocol (HTTP)). Similarly, the instructions 2602 may be transmitted or received using a transmission medium via a coupling (e.g., a peer-to-peer coupling) to the devices 2640.

Software Architecture

Figure 27:
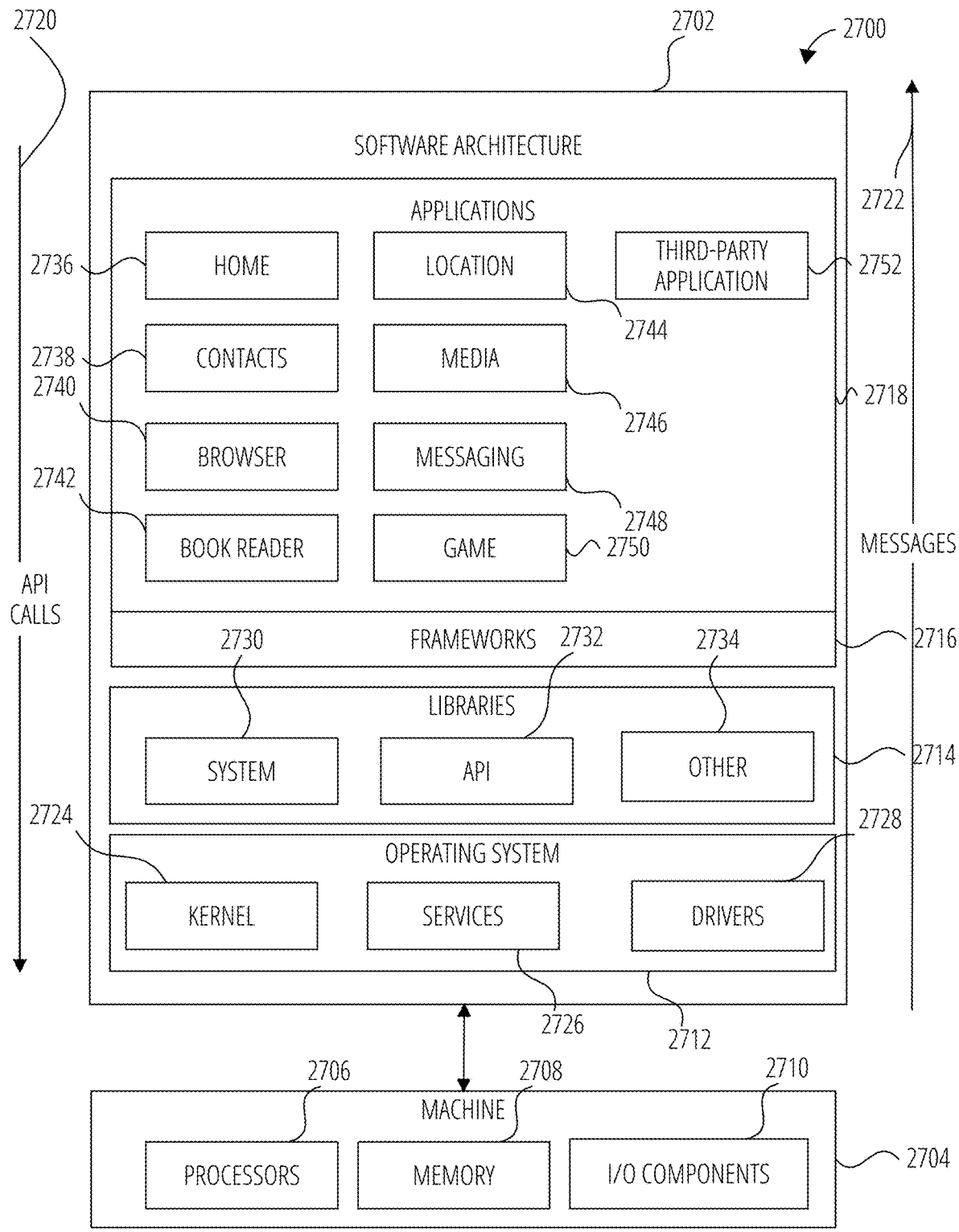
FIG. 27 is a block diagram showing a software architecture within which examples may be implemented.

FIG. 27 is a block diagram 2700 illustrating a software architecture 2702, which can be installed on any one or more of the devices described herein. The software architecture 2702 is supported by hardware such as a machine 2704 that includes processors 2706, memory 2708, and I/O components 2710. In this example, the software architecture 2702 can be conceptualized as a stack of layers, where each layer provides a particular functionality. The software architecture 2702 includes layers such as an operating system 2712, libraries 2714, frameworks 2716, and applications 2718. Operationally, the applications 2718 invoke API calls 2720 through the software stack and receive messages 2722 in response to the API calls 2720.

The operating system 2712 manages hardware resources and provides common services. The operating system 2712 includes, for example, a kernel 2724, services 2726, and drivers 2728. The kernel 2724 acts as an abstraction layer between the hardware and the other software layers. For example, the kernel 2724 provides memory management, processor management (e.g., scheduling), component management, networking, and security settings, among other functionalities. The services 2726 can provide other common services for the other software layers. The drivers 2728 are responsible for controlling or interfacing with the underlying hardware. For instance, the drivers 2728 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 2714 provide a common low-level infrastructure used by the applications 2718. The libraries 2714 can include system libraries 2730 (e.g., C standard library) that provide functions such as memory allocation functions, string manipulation functions, mathematic functions, and the like. In addition, the libraries 2714 can include API libraries 2732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 2714 can also include a wide variety of other libraries 2734 to provide many other APIs to the applications 2718.

The frameworks 2716 provide a common high-level infrastructure that is used by the applications 2718. For example, the frameworks 2716 provide various graphical user interface (GUI) functions, high-level resource management, and high-level location services. The frameworks 2716 can provide a broad spectrum of other APIs that can be used by the applications 2718, some of which may be specific to a particular operating system or platform.

In an example, the applications 2718 may include a home application 2736, a contacts application 2738, a browser application 2740, a book reader application 2742, a location application 2744, a media application 2746, a messaging application 2748, a game application 2750, and a broad assortment of other applications such as a third-party application 2752. The applications 2718 are programs that execute functions defined in the programs. Various programming languages can be employed to create one or more of the applications 2718, structured in a variety of manners, such as object-oriented programming languages (e.g., Objective-C, Java, or C++) or procedural programming languages (e.g., C or assembly language). In a specific example, the third-party application 2752 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 2752 can invoke the API calls 2720 provided by the operating system 2712 to facilitate functionalities described herein.

CONCLUSION

When the effects in this disclosure are considered in aggregate, one or more of the methodologies described herein may not only provide improved software and system functionality, enabling users to express themselves in more creative and/or additional ways, but also (or alternatively) obviate a need for certain efforts or resources that otherwise would be involved in image selections.

Computing resources used by one or more machines, databases, or networks may be more efficiently utilized or even reduced, e.g., as a result of a user being able to select a desired image from a plurality of candidate images without having to download all the candidate images on a user device, or as a result of a user being able to perform automatic image generation and profile linking in a single process, or as a result of a user not having to manually modify, submit or re-submit prompts in an attempt to obtain image options, or as a result of a user not having to source an automatically generated image from an external application and upload it to the relevant interaction system. Examples of such computing resources may include processor cycles, network traffic, memory usage, graphics processing unit (GPU) resources, data storage capacity, power consumption, and cooling capacity.

While examples described in this disclosure focus on image generation and the use of images in an interaction system, it will be appreciated that techniques described herein may be applied to video generation and the use of videos in an interaction system, e.g., automatically generating a video, comprising a sequence of digital image frames, based on an input prompt, and then linking the video to one or more user profiles or utilizing the video in augmentation of a media content item.

As used in this disclosure, phrases of the form "at least one of an A, a B, or a C," "at least one of A, B, or C," "at least one of A, B, and C," and the like, should be interpreted to select at least one from the group that comprises "A, B, and C." Unless explicitly stated otherwise in connection with a particular instance in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

Although some examples, e.g., those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence.

Glossary

"Carrier signal" refers, for example, to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers, for example, to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

"Processor" refers, for example, to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a manner as to encode information in the signal. The terms "transmission medium" and "signal medium" mean the same thing and may be used interchangeably in this disclosure.

"Text object" refers to, for example, any character or sequence of characters. A text object may thus include letters, numbers, punctuation, and other symbols. A text object can represent a single character, a word, or a longer string of text.

"User device" refers, for example, to a device accessed, controlled or owned by a user and with which the user interacts to perform an action, or an interaction with other users or computer systems.

What is claimed is:

1. A system comprising:
a memory that stores instructions; and
one or more processors configured by the instructions to perform operations comprising:
causing presentation, at a first user device associated with a first user of an interaction system, of a prompt selection interface of an interaction application provided by the interaction system, the interaction application enabling the first user to obtain automatically generated images and to interact with at least a second user of the interaction system;
receiving, from the first user device and via the prompt selection interface of the interaction application, an image generation request comprising a text prompt;
responsive to receiving the image generation request via the prompt selection interface of the interaction application, generating, via an automated text-to-image generator associated with the interaction system and based on the text prompt, an image;
causing presentation, at the first user device, of the image in an image selection interface of the interaction application;
receiving, from the first user device and via the image selection interface of the interaction application, an indication of user input to select the image; and
responsive to receiving the indication of the user input to select, via the image selection interface of the interaction application, the image generated via the automated text-to-image generator:
modifying, using the selected image generated via the automated text-to-image generator, a user image that is associated with the first user within the interaction system, and
enabling the second user of the interaction system to be presented with the modified user image via the interaction application.

2. The system of claim 1, wherein the generating of the image comprises generating, via the automated text-to-image generator, a plurality of candidate images, the causing presentation of the image at the first user device comprising causing presentation of the plurality of candidate images at the first user device in the image selection interface of the interaction application, and wherein the user input to select the image identifies the image from among the plurality of candidate images.

3. The system of claim 2, wherein the causing presentation of the plurality of candidate images comprises automatically arranging the plurality of candidate images in a grid within the image selection interface.

4. The system of claim 1, wherein the modifying of the user image of the first user within the interaction system comprises replacing a previous user image associated with a first user profile of the first user with the modified user image.

5. The system of claim 4, wherein the modified user image is stored as a user profile image.

6. The system of claim 1, the operations further comprising:
receiving, from the first user device, a conversation-specific wallpaper request, the image generation request being associated with the conversation-specific wallpaper request,
wherein the modifying of the user image of the first user comprises storing the selected image as a conversation-specific wallpaper in association with a first user profile of the first user and a second user profile of the second user.

7. The system of claim 6, wherein the enabling of the second user to be presented with the modified user image comprises causing presentation of the conversation-specific wallpaper in an interaction interface of the interaction application that is generated at the first user device and at the second user device to enable electronic conversations between the first user and the second user within the interaction system.

8. The system of claim 6, wherein the conversation-specific wallpaper request comprises an identifier of the second user.

9. The system of claim 1, wherein
the prompt selection interface includes a text input section.

10. The system of claim 9, wherein the prompt selection interface further includes a set of user-selectable sample text prompts, wherein user selection of a sample text prompt from the set of user-selectable sample text prompts causes presentation of the sample text prompt within the text input section.

11. The system of claim 9, wherein the prompt selection interface further includes a set of user-selectable sample text prompts, wherein user selection of a sample text prompt from the set of user-selectable sample text prompts causes the sample text prompt to be included in the image generation request.

12. The system of claim 9, wherein the prompt selection interface further includes an automatic prompt generation element, the automatic prompt generation element being user-selectable to cause automatic generation of a candidate text prompt.

13. The system of claim 12, the operations further comprising:
receiving, from the first user device, an indication of user input to select the automatic prompt generation element;
responsive to receiving the indication of user input to select the automatic prompt generation element, automatically generating, by a processor-implemented prompt generator, the candidate text prompt; and
causing presentation of the candidate text prompt in the text input section.

14. The system of claim 1, wherein the automated text-to-image generator comprises a text-to-image machine learning model.

15. The system of claim 14, wherein the text-to-image machine learning model is at least one of a diffusion model, a Generative Adversarial Network (GAN), a Variational Autoencoder (VAE), or an autoregressive model.

16. The system of claim 1, further comprising, prior to the generating, via the automated text-to-image generator, of the image:
- analyzing, by a processor-implemented content moderation engine of the interaction system, the text prompt; and
- in response to detecting, by the processor-implemented content moderation engine of the interaction system, that the text prompt is not a restricted prompt, transmitting the text prompt to the automated text-to-image generator.

17. The system of claim 1, the operations further comprising:
- receiving, from the first user device, a content item augmentation request, the modifying of the user image of the first user comprising applying the selected image as an augmentation to a media content item selected by the first user, the media content item comprising the user image, and wherein the enabling of the second user to be presented with the modified user image comprises enabling the second user to access the media content item after the augmentation is applied.

18. The system of claim 17, wherein the applying of the selected image as the augmentation to the media content item comprises generating a segmentation mask and applying, based on the segmentation mask, the selected image as a background to the media content item.

19. A method comprising:
- causing presentation, at a first user device associated with a first user of an interaction system, of a prompt selection interface of an interaction application provided by the interaction system, the interaction application enabling the first user to obtain automatically generated images and to interact with at least a second user of the interaction system;
- receiving, from the first user device and via the prompt selection interface of the interaction application, an image generation request comprising a text prompt;
- responsive to receiving the image generation request via the prompt selection interface of the interaction application, generating, via an automated text-to-image generator associated with the interaction system and based on the text prompt, an image;
- causing presentation, at the first user device, of the image in an image selection interface of the interaction application;
- receiving, from the first user device and via the image selection interface of the interaction application, an indication of user input to select the image; and
- responsive to receiving the indication of the user input to select, via the image selection interface of the interaction application, the image generated via the automated text-to-image generator:
  - modifying, by one or more processors and using the selected image generated via the automated text-to-image generator, a user image that is associated with the first user within the interaction system, and
  - enabling, by the one or more processors, the second user of the interaction system to be presented with the modified user image via the interaction application.

20. A non-transitory computer-readable storage medium, the computer-readable storage medium including instructions that when executed by at least one processor, cause the at least one processor to perform operations comprising:
- causing presentation, at a first user device associated with a first user of an interaction system, of a prompt selection interface of an interaction application provided by the interaction system, the interaction application enabling the first user to obtain automatically generated images and to interact with at least a second user of the interaction system;
- receiving, from the first user device and via the prompt selection interface of the interaction application, an image generation request comprising a text prompt;
- responsive to receiving the image generation request via the prompt selection interface of the interaction application, generating, via an automated text-to-image generator associated with the interaction system and based on the text prompt, an image;
- causing presentation, at the first user device, of the image in an image selection interface of the interaction application;
- receiving, from the first user device and via the image selection interface of the interaction application, an indication of user input to select the image; and
- responsive to receiving the indication of the user input to select, via the image selection interface of the interaction application, the image generated via the automated text-to-image generator:
  - modifying, using the selected image generated via the automated text-to-image generator, a user image that is associated with the first user within the interaction system, and
  - enabling the second user of the interaction system to be presented with the modified user image via the interaction application.

* * * * *